US009615376B2

(12) United States Patent
Kato

(10) Patent No.: US 9,615,376 B2
(45) Date of Patent: Apr. 4, 2017

(54) WIRELESS BASE STATION DEVICE, WIRELESS RESOURCE MANAGEMENT METHOD, AND WIRELESS RESOURCE MANAGEMENT PROGRAM

(71) Applicant: Panasonic Intellectual Property Management Co., Ltd., Osaka (JP)

(72) Inventor: Osamu Kato, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 135 days.

(21) Appl. No.: 14/523,073

(22) Filed: Oct. 24, 2014

(65) Prior Publication Data

US 2015/0043504 A1    Feb. 12, 2015

Related U.S. Application Data

(63) Continuation-in-part of application No. PCT/JP2013/002711, filed on Apr. 22, 2013.

(30) Foreign Application Priority Data

Apr. 27, 2012  (JP) ................................. 2012-104121

(51) Int. Cl.
*H04W 4/00* (2009.01)
*H04W 72/10* (2009.01)
*H04W 72/04* (2009.01)

(52) U.S. Cl.
CPC ........ *H04W 72/10* (2013.01); *H04W 72/0453* (2013.01)

(58) Field of Classification Search
CPC .......... H04B 7/2123; H04J 2203/0069; H04W 72/04; H04W 72/12

USPC .......................................... 370/329, 328, 330
See application file for complete search history.

(56) References Cited

U.S. PATENT DOCUMENTS

| 4,747,101 A | 5/1988 | Akaiwa et al. | |
|---|---|---|---|
| 9,112,663 B2* | 8/2015 | Nakashima | ........... H04L 5/0057 |
| 2007/0238469 A1* | 10/2007 | Tsukamoto | ........... H04W 88/08 |
| | | | 455/450 |
| 2009/0003201 A1* | 1/2009 | Horvitz | ................. H04L 41/147 |
| | | | 370/229 |
| 2010/0216477 A1 | 8/2010 | Ryan | |
| 2010/0323694 A1 | 12/2010 | Altintas | |

(Continued)

FOREIGN PATENT DOCUMENTS

| JP | 61-244137 A | 10/1986 |
|---|---|---|
| JP | 03-289825 A | 12/1991 |

(Continued)

OTHER PUBLICATIONS

International Search Report, mailed Jul. 9, 2013, for PCT/JP2013/002711, 4 pages.

*Primary Examiner* — Chuong T Ho
(74) *Attorney, Agent, or Firm* — Seed IP Law Group LLP

(57) ABSTRACT

Provided is a wireless base station device capable of allocating radio resources with high accuracy. The wireless base station device includes a radio resource allocation unit that allocates radio resources to a wireless communication device, and a priority setting unit that sets a priority of a frequency for allocating the radio resources by the radio resource allocation unit, depending on an allocation amount of the radio resources for each frequency allocated by the radio resource allocation unit.

19 Claims, 16 Drawing Sheets

(56) References Cited

U.S. PATENT DOCUMENTS

| | | |
|---|---|---|
| 2011/0275322 A1 | 11/2011 | Sawai et al. |
| 2012/0094706 A1* | 4/2012 | Fukumoto ........... H04W 72/048 455/512 |
| 2012/0182910 A1* | 7/2012 | Nakashima ........... H04L 5/0057 370/281 |
| 2012/0213107 A1* | 8/2012 | Jang ...................... H04W 24/10 370/252 |

FOREIGN PATENT DOCUMENTS

| | | |
|---|---|---|
| JP | 2009-005196 A | 1/2009 |
| WO | 2009/104689 A1 | 8/2009 |
| WO | 2010/084801 A1 | 7/2010 |

* cited by examiner

FIG. 5

|  | BS1 | BS2 | BS3 | BS4 |
|---|---|---|---|---|
| f1 | 9 | 10 | 71 | 16 |
| f2 | 2 | 54 | 4 | 5 |
| f3 | 23 | 3 | 0 | 40 |
| f4 | 5 | 1 | 28 | 13 |
| f5 | 4 | 6 | 41 | 18 |

| | DATA AMOUNT @BS |
|---|---|
| f1 | 3 |
| f2 | 45 |
| f3 | 12 |
| f4 | 41 |
| f5 | 23 |
| ⋮ | ⋮ |
| f10 | 19 |

TB1,TB3

UPDATE →

| | DATA AMOUNT @BS |
|---|---|
| f1 | 3 |
| f2 | 49 |
| f3 | 12 |
| f4 | 41 |
| f5 | 23 |
| ⋮ | ⋮ |
| f10 | 19 |

| | DATA AMOUNT |
|---|---|
| f1 | 92 |
| f2 | 73 |
| f3 | 131 |
| f4 | 212 |
| f5 | 5 |
| f6 | 0 |

| | DATA AMOUNT |
|---|---|
| f1 | 3 |
| f2 | 5 |
| f3 | 6 |
| f4 | 2 |
| f5 | 43 |
| f6 | 30 |

FIG. 14A — TB1A

| | BS1 | BS2 | BS3 |
|---|---|---|---|
| f1 | 40 | 2 | 1 |
| f2 | 7 | 86 | 28 |
| f3 | 11 | 21 | 90 |
| f4 | 33 | 10 | 6 |
| f5 | 26 | 2 | 7 |

FIG. 14B — TB1B

| | BS1 | BS2 | BS3 |
|---|---|---|---|
| f1 | 5 | 29 | 4 |
| f2 | 3 | 2 | 50 |
| f3 | 4 | 5 | 21 |
| f4 | 9 | 30 | 14 |
| f5 | 4 | 6 | 40 |

FIG. 14C — TB1C

| | BS1 | BS2 | BS3 |
|---|---|---|---|
| f1 | 2 | 35 | 13 |
| f2 | 5 | 5 | 23 |
| f3 | 3 | 36 | 4 |
| f4 | 8 | 9 | 28 |
| f5 | 1 | 3 | 21 |

FIG. 14D — TB1D

| | BS1 | BS2 | BS3 |
|---|---|---|---|
| f1 | 47 | 66 | 18 |
| f2 | 15 | 93 | 101 |
| f3 | 18 | 62 | 115 |
| f4 | 50 | 49 | 48 |
| f5 | 31 | 11 | 68 |

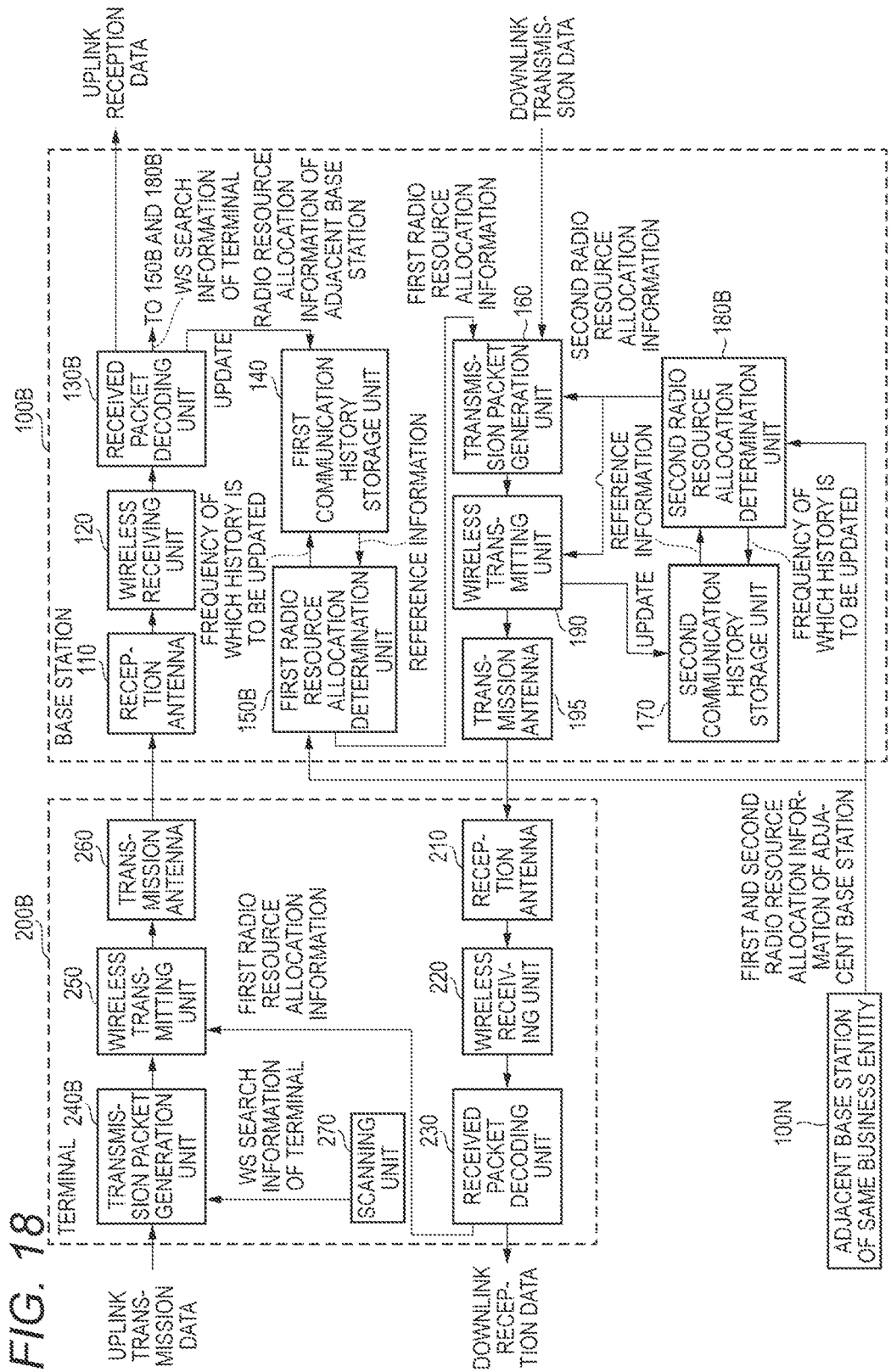

WIRELESS BASE STATION DEVICE, WIRELESS RESOURCE MANAGEMENT METHOD, AND WIRELESS RESOURCE MANAGEMENT PROGRAM

BACKGROUND

1. Field of the Invention

The present invention relates to a wireless base station device, a radio resource management method, and a radio resource management program.

2. Description of the Related Art

As a wireless communication system of the related art, there is a system including a base station and a subscriber's wireless station communicating with the base station, in which the system is capable of using one or a plurality of certain channels among a plurality of wireless channels, and starts communication after confirming that a channel to be used is an available channel. The system employs a wireless communication scheme that gives priority to each channel and sequentially uses the channel from a channel with higher priority.

For example, in the wireless communication scheme, variably determining the priority for using a channel depending on the past history of channel usage is known (for example, see JP-A-61-244137).

SUMMARY

In the wireless communication scheme of JP-A-61-244137, whenever communication is performed, the priority of the used channel (frequency channel) increases. In other words, the priority increases according to the number of times which channels are allocated. Further, since the wireless communication is mainly audio communication with a small amount of data, the number of uses of channels and the degree of uses of channels (how many channels are used) make a proportional relationship.

However, wireless communication in recent years may include communication of moving images having a large amount of data, in addition to the audio communication. Further, radio resources for performing wireless communication may be frequency components of a portion of the same frequency channel, or intermittent or distributed time components. In this manner, wireless communication and the radio resource are diversified.

Therefore, the number of uses of the radio resource and the degree of uses of the radio resource do not always make a proportional relationship. For example, the degrees of usage of the radio resources are significantly different in the case of a call for a few minutes and the case of a TV conference for one hour, but the number of use is similarly counted as one time in the wireless communication scheme of JP-A-61-244137. Accordingly, the radio resource cannot necessarily be allocated with high accuracy in such a manner that interference is reduced stochastically and wireless communication of as high quality as possible can be performed for traffic.

A non-limited object of the present invention is to provide a wireless base station device, a radio resource management method, and a radio resource management program, which are capable of allocating radio resources with high accuracy.

A wireless base station device according to an aspect of the present invention includes: a radio resource allocation unit that allocates radio resources to a wireless communication device; and a priority setting unit that sets a priority of a frequency for allocating the radio resources by the radio resource allocation unit, according to an allocation amount of the radio resources for each frequency allocated by the radio resource allocation unit.

According to this configuration, it is possible to set priority of a frequency used for wireless communication, depending on the record of an allocated amount of radio resources in the past. Therefore, since the radio resources can be allocated with high accuracy, communication reliability is improved.

The wireless base station device according to the aspect of the present invention may be configured by further including a communication unit that communicates data by using the radio resources that are allocated by the radio resource allocation unit, wherein the priority setting unit sets the priority of the frequency, according to a data amount of the data for each frequency that is communicated by the communication unit.

According to this configuration, it is possible to set the priority of the frequency used for wireless communication, depending on the record of the communication data amount in the past. Therefore, since the radio resources can be allocated with high accuracy, communication reliability is improved.

The wireless base station device according to the aspect of the present invention may be configured by further including a communication unit that communicates data by using the radio resources that are allocated by the radio resource allocation unit, wherein the priority setting unit sets the priority of the frequency, according to a total time for each frequency in which data is communicated by the communication unit.

According to this configuration, it is possible to set the priority of the frequency used for wireless communication, depending on the record of a total communication time in the past. Therefore, since the radio resources can be allocated with high accuracy, communication reliability is improved.

The wireless base station device according to the aspect of the present invention may be configured such that the priority setting unit sets the priority of the frequency to be higher as a frequency has more allocation amount of the radio resource or data amount communicated by the communication unit, or as a frequency has a longer total time in which data is communicated by the communication unit.

According to this configuration, if a frequency has a past record, the priority of the frequency is increased. Therefore, since it is possible to communicate data by using a radio resource of a frequency with a high communication success probability, the communication reliability is improved.

The wireless base station device according to the aspect of the present invention may be configured by including a reception unit that receives communication history information regarding another station including information regarding an allocation amount of radio resources for each frequency, a communication data amount for each frequency, or information regarding a total communication time for each frequency by another wireless base station device, wherein the radio resource allocation unit allocates the radio resources, based on the priority which is set by the priority setting unit and the communication history information regarding another station that is received by the reception unit.

According to this configuration, since radio resources are allocated, depending on a past communication record of another wireless base station device, it is possible to communicate data with high accuracy similarly even by the wireless base station device which is its own station.

The wireless base station device according to the aspect of the present invention may be configured such that the radio resource allocation unit allocates the radio resources, according to the priority which is set by the priority setting unit, and a usage state of radio resources in a vicinity of the wireless communication device.

According to this configuration, it is possible to determine whether or not communication interference occurs by ascertaining a communication environment in the vicinity of the wireless communication device (for example, a wireless communication terminal or a wireless base station device). Accordingly, even if a frequency has a high priority, when an occurrence probability of communication interference is high, the radio resource of the frequency is not selected, and thus communication reliability is improved.

The wireless base station device according to the aspect of the present invention may include a reception unit that receives information regarding the usage state of radio resources in the vicinity of the wireless communication device.

According to this configuration, it is possible to obtain information regarding the communication environment from another wireless communication device.

The wireless base station device according to the aspect of the present invention may be configured by including a storage unit that stores communication history information including information regarding an allocation amount of radio resources for each frequency, a communication data amount for each frequency; or a total communication time for each frequency, and an updating unit that updates the communication history information, based on an allocation amount of radio resources for each frequency that are allocated by the radio resource allocation unit, an amount of data that is communicated by the communication unit, or a total time in which data is communicated by the communication unit, wherein the priority setting unit sets the priority of the frequency, based on the communication history information.

According to this configuration, the communication record of a certain period in the past is gradually updated in a storage unit as communication history information. Accordingly, since the reliability of the values of the communication record stored in the storage unit are improved, the accuracy of radio resource allocation is improved. It is has been considered to set a length of time of a certain period to, for example, several weeks or several hours. When the time length is set to be shorter, priority strongly reflects the record of the latest radio resource allocation. In extreme cases, it has been considered to use the communication record of a period until the frequency used most recently reaches an appropriate number (for example, three frequencies) as history information for priority, instead of the communication record for a certain period in the past. In this case, it is possible to simplify the need for management of, for example, the allocation amount or the data amount to a need for management of a frequency number.

The wireless base station device according to the aspect of the present invention may be configured such that the priority setting unit sets the priority of the frequency, depending on whether the communication unit communicates data from another wireless communication device to the wireless base station device, or from the wireless base station device to another wireless communication device.

According to this configuration, even when using communication channels having different communication situations in the uplink channel and downlink channel, the radio resources of frequencies suitable for the respective communication channels are allocated.

The wireless base station device according to the aspect of the present invention may include a storage unit that stores first communication history information for communicating data from the another wireless communication device to the wireless base station device by the communication unit, and second communication history information for communicating data from the wireless base station device to the another wireless communication device by the communication unit.

According to this configuration, the communication record of data communication through the uplink channel and the communication record of data communication through the downlink channel can be managed by being separated.

The wireless base station device according to the aspect of the present invention may be configured such that the priority setting unit sets the priority of the frequency, depending on transmission power applied when the communication unit communicates data.

According to this configuration, even in a communication system in which there are wireless base station devices that communicate with different transmission power, the radio resources of frequencies suitable for transmission power of the wireless base station devices or the terminals are allocated. For example, radio resources allocated in order for a base station and a terminal in a macrocell having a large cell radius to communicate with relatively large transmission power, and radio resources allocated in order for a base station and a terminal in a microcell, a picocell, or a femtocell to communicate with relatively low transmission power can be managed by being separated. In particular, in a heterogeneous network having a cellular system configuration of different cell sizes, it is effective to manage priorities in a separated manner, depending on transmission power.

The wireless base station device according to the aspect of the present invention may include a storage unit that stores communication history information, for each transmission power applied when the communication unit communicates data.

According to this configuration, for example, the record of data communication with high transmission power and the record of data communication with low transmission power can be managed by being separated.

The wireless base station device according to the aspect of the present invention may be configured such that the priority setting unit sets the priority of the frequency, depending on a time zone in which the communication unit communicates data.

According to this configuration, even when the characteristics of separate communication traffic are different depending on the time zone, the radio resource of a frequency suitable for each time zone is allocated.

The wireless base station device according to the aspect of the present invention may include a storage unit that stores communication history information, for each time zone in which the communication unit communicates data.

According to this configuration, for example, the record of data communication in the daytime on weekdays, the record of data communication in the night time on weekdays, and the record of data communication on weekends can be managed by being separated.

A radio resource management method according to an aspect of the present invention is a radio resource management method in a wireless base station device, the method including a radio resource allocation step of allocating radio resources of a frequency to a wireless communication device, and a priority setting step of setting a priority of a frequency for allocating the radio resources in the radio resource allocation step, depending on an allocation amount of the radio resources for each frequency allocated in the radio resource allocation step.

According to this method, it is possible to set the priority of a frequency used in wireless communication, depending on the record of the allocated amount of radio resources in the past. Therefore, since the radio resources can be allocated with high accuracy, communication reliability is improved.

A radio resource management program according to an aspect of the present invention is a program causing a computer to execute respective steps of the radio resource management method.

According to this program, it is possible to set the priority of a frequency used in wireless communication, depending on the record of the allocated amount of radio resources in the past. Therefore, since the radio resources can be allocated with high accuracy, communication reliability is improved.

According to the present invention, radio resources can be allocated with high accuracy.

BRIEF DESCRIPTION OF THE DRAWINGS

FIG. 5 is a diagram illustrating an example of a communication history table according to the first embodiment of the present invention.

FIG. 7 is a diagram illustrating an aspect of updating the communication history table according to the first embodiment of the present invention.

FIGS. 11A and 11B are diagrams each illustrating an example of a communication history table according to the third embodiment of the present invention.

FIGS. 14A to 14D are diagrams each illustrating an example of a communication history table according to a fourth embodiment of the present invention.

FIG. 18 is a block diagram illustrating a modified configuration example of the wireless base station device and the wireless communication terminal of the second embodiment of the present invention.

DETAILED DESCRIPTION

Hereinafter, embodiments of the present invention will be described with reference to the drawings.

Figure 1:
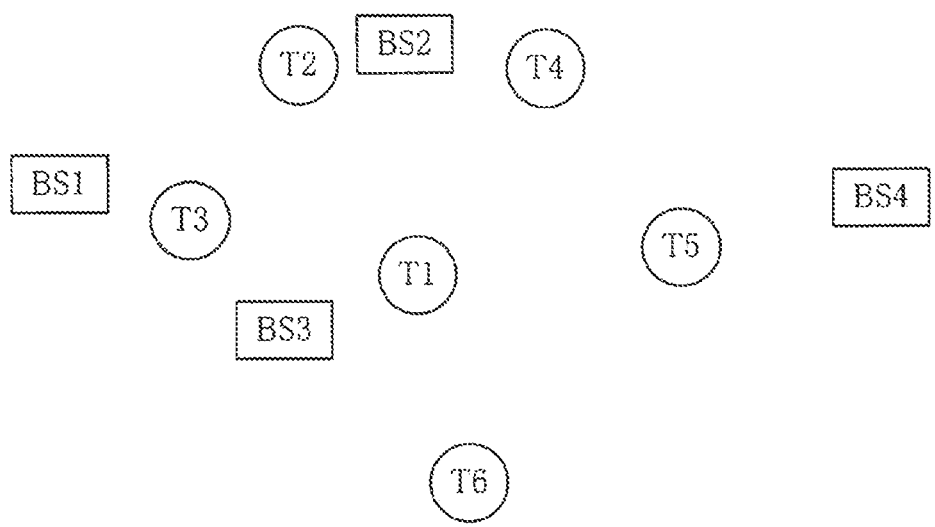
FIG. 1 is a diagram illustrating an arrangement example of a plurality of wireless base station devices and a plurality of wireless communication terminals in a communication system according to embodiments of the present invention.

FIG. 1 is a diagram illustrating an arrangement example of a plurality of wireless base station devices and a plurality of wireless communication terminals in a communication system according to an embodiment of the present invention. Symbols BS1 to BS4 (BS: base station) indicate wireless base station devices (here, simply referred to as "base station") arranged in the respective base stations. Symbols T1 to T6 (T: terminal) indicate wireless communication terminals (hereinafter, simply referred to as a "terminal") managed by the respective base stations BS1 to BS4.

The base stations BS1 to BS4 and the terminals T1 to T6 may constitute one communication system, or a plurality of communication systems. Further, the base stations BS1 to BS4 may respectively be facilities of the same business entity or facilities of a plurality of business entities. Accordingly, the example of FIG. 1 may be a communication environment in which there are a plurality of communication systems. A case in which the base stations BS1 to BS4 are facilities of the same business entity is illustrated in a first embodiment, and a case in which the base stations BS1 to BS4 are facilities of the plurality of business entities is illustrated in a second embodiment.

Different base stations of the same business entity may perform various processes in cooperation with each other. Further, the terminals T1 to T6 may be mobile terminals which are movable.

For example, communication using a wireless local area network (LAN) and communication using a wireless regional area network (RAN) such as an IEEE802.22 standard are assumed as communication schemes of the communication system. Further, for example, communication using a cellular type wireless communication scheme such as long term evolution (LTE) is assumed.

Figure 2:
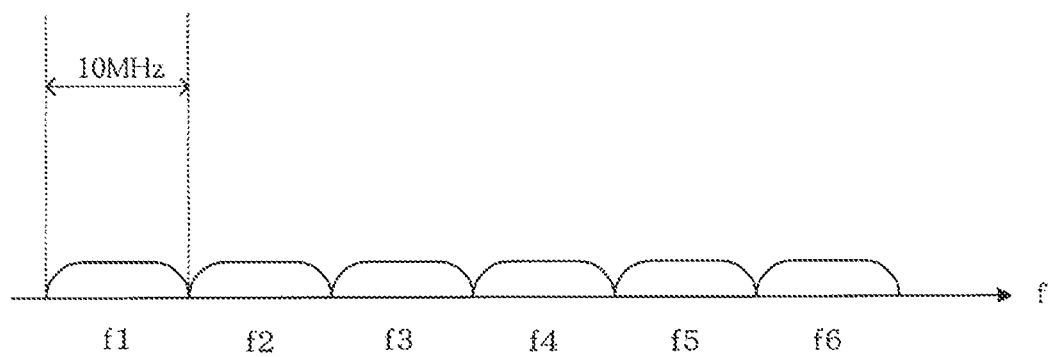
FIG. 2 is a diagram illustrating an example of frequencies used in the communication system according to the embodiments of the present invention.
Figure 3:
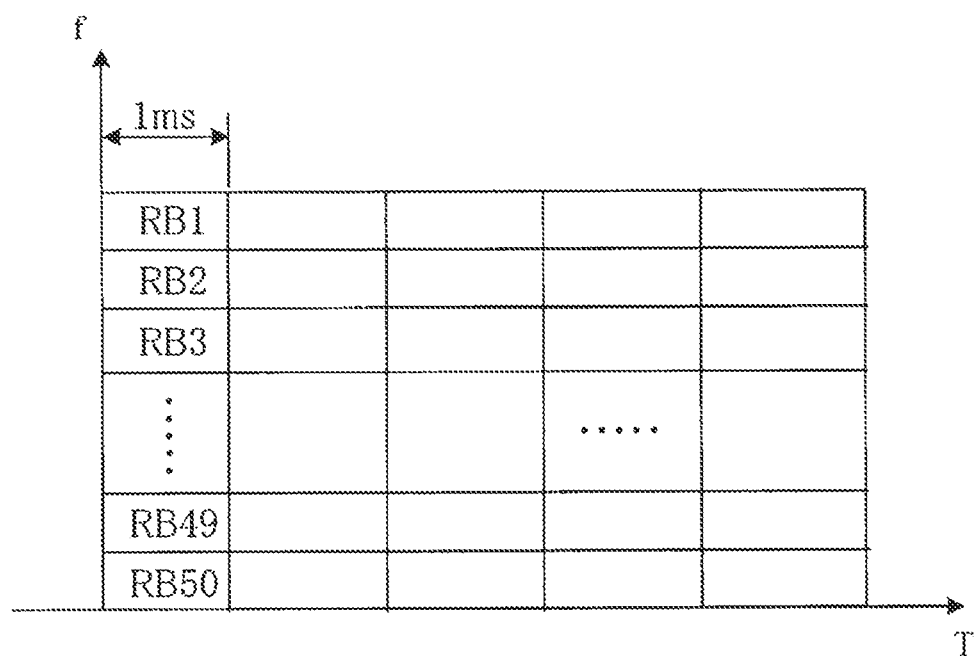
FIG. 3 is a diagram illustrating an example of radio resources used in the communication system according to the embodiments of the present invention.

Next, a radio resource (RR) for communication in the communication system will be described. FIG. 2 is a diagram illustrating an example of frequencies used in the communication system. FIG. 3 is a diagram illustrating an example of radio resources used in the communication system.

The communication system of FIG. 1 employs, for example, a long time evolution (LTE) scheme as a communication scheme. The LTE scheme employs an orthogonal frequency division multiplexing (OFDM) scheme as a modulation scheme.

In the case of the OFDM scheme, intervals of respective subcarrier frequencies are, for example, 15 kHz in the LTE scheme. The minimum unit of allocation of radio resources used in the LTE scheme is "12 subcarrier frequencies×1 ms", and is referred to as a resource block (RB). Accordingly, a frequency width in a frequency domain is "12×15=180 kHz". Further, a time width of RB in a time domain is 1 ms.

Further, FIG. 2 illustrates a case in which a predetermined business entity uses six frequency bands each having a 10 MHz-width as a dedicated frequency band. When the frequency bandwidth is 10 MHz, the end part is a guard band, and thus the frequency amount available for the allocation of the radio resource is, for example, 9 MHz. In this case, as illustrated in FIG. 3, the radio resource includes 50 RBs per 1 ms in the frequency band having the 10 MHz-width. Accordingly, when there are six frequency bands each having the 10 MHz-width as FIG. 2, the number of the RBs per 1 ms is 300.

One or more RBs of radio resources may be allocated per one terminal, and the RBs may be continuous or discontinuous in the frequency domain and the time domain, with the RB as a minimum unit.

The base station BS allocates the radio resources to a wireless communication device that communicates data, according to a predetermined policy. The predetermined policy is referred to as, for example, scheduling or adaptive resource management.

(First Embodiment)

According to the first embodiment, a case is assumed in which the same business entity uses dedicated radio resources in the communication system.

Figure 4:
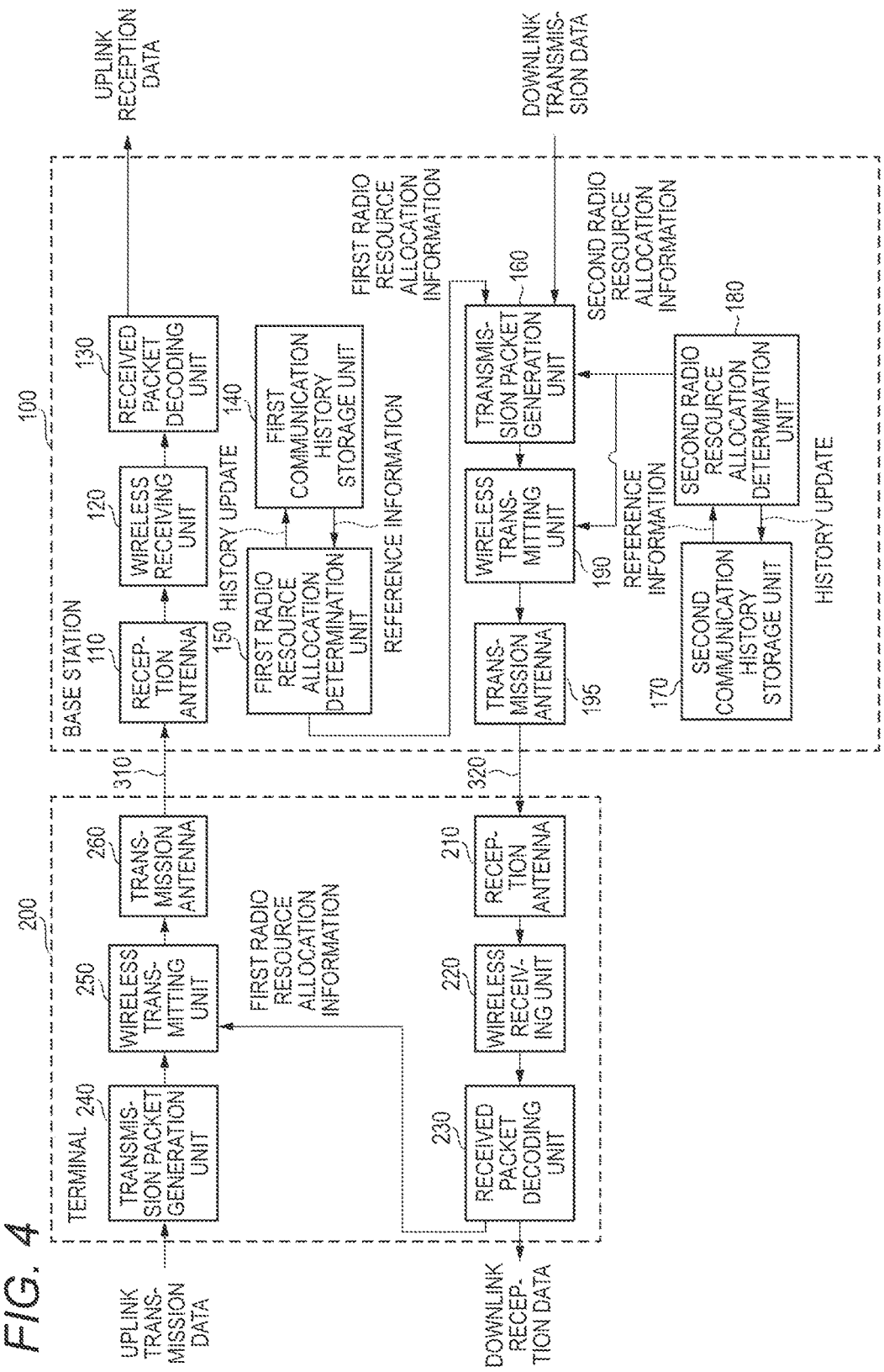
FIG. 4 is a block diagram illustrating a configuration example of a wireless base station device and a wireless communication terminal according to a first embodiment of the present invention.

FIG. 4 is a block diagram illustrating a configuration example of a base station 100 and a terminal 200 according to the first embodiment. The base station 100 corresponds to the base stations BS1 to BS4 illustrated in FIG. 1, and any base station has the same configuration. The terminal 200 corresponds to the wireless communication terminals Ta1 to Ta6 illustrated in FIG. 1, and any wireless communication terminal has the same configuration.

Further, the base station 100 and the terminal 200 are one of the wireless communication devices managed by the base station 100. In other words, in the following description, the wireless communication device means the base station 100 or the terminal 200. The base station 100 determines which frequency among a plurality of frequencies is to be allocated to the wireless communication device (details will be described later). Accordingly, the base station 100 may determine a frequency between another base station 100 and itself, but a description will be made focusing on the determination regarding a frequency for allocating the radio resources to the terminal 200 by the base station 100.

In addition, the wireless communication device managed by the base station 100 is, for example, a wireless communication device which is in a connected state with the base station 100. The wireless communication device which is in the connected state can communicate by using a frequency allocated by the base station 100. Meanwhile, the base station 100 releases the connection state with a wireless communication device for which a disconnection request is issued, a wireless communication device that does not communicate for a predetermined time, or a wireless communication device that has completed communication (the use of the radio resource which will be described later has been completed). Of course, a releasing method of the connection state described above is an example, and is not particularly limited.

The base station 100 includes a reception antenna 110, a wireless receiving unit 120, a received packet decoding unit 130, a first communication history storage unit 140, a first radio resource allocation determination unit 150, and a transmission packet generation unit 160. Further, the base station 100 includes a second communication history storage unit 170, a second radio resource allocation determination unit 180, a wireless transmitting unit 190, and a transmission antenna 195.

A wireless channel that is established between the base station 100 and the terminal 200 includes an uplink channel 310 for transmitting a signal (packet) from the terminal 200 to the base station 100, and a downlink channel 320 for transmitting a signal (packet) from the base station 100 to the terminal 200. The base station 100 communicates by using the radio resource, through the wireless channel, with one or more terminals 200.

The reception antenna 110 receives a communication signal that is communicated through the uplink channel 310, and outputs the communication signal as a reception signal to the wireless receiving unit 120.

The wireless receiving unit 120 receives the reception signal from the reception antenna 110. Further, the wireless receiving unit 120 performs, for example, a demodulation process and a frequency-conversion process on the reception signal so as to acquire a reception packet from the reception signal. The wireless receiving unit 120 outputs the reception packet to the received packet decoding unit 130.

The received packet decoding unit 130 receives the reception packet from the wireless receiving unit 120, and performs a decoding process on the reception packet. Through the decoding process, the received packet decoding unit 130 acquires, for example, user data (for example, image data and audio data) from the terminal 200. The user data is output to a processing unit at a subsequent stage which is not shown.

The first communication history storage unit 140 is configured by, for example, a random access memory (RAM). The first communication history storage unit 140 includes a communication history table TB1 that stores an allocation amount of the radio resource of data that has been communicated in the past through the uplink channel 310 from the terminal 200 to the base station 100 for each frequency. The allocation amount of the radio resource is, for example, the allocation amount of the RB described above. Further, the information stored in the communication history table TB1 is an example of the communication history information and an example of the first communication history information.

The memory content of the communication history table TB1 is updated based on information regarding the frequency with which the history from the first radio resource allocation determination unit 150 is to be updated and information regarding the allocation amount of the radio resource. The information stored in the first communication history storage unit 140 is updated by the first radio resource allocation determination unit 150. Further, in the communication history table TB1, information may be reset at regular intervals.

The first radio resource allocation determination unit 150 allocates the radio resource to the terminal 200, by referring to the radio resource allocation table stored in the storage unit which is not shown. The radio resource allocation table stores information indicating relation between radio resources of frequencies and wireless communication devices managed by the base station 100. If allocation of radio resources is performed, the radio resources are registered in the radio resource allocation table. If the allocation of the radio resources is completed, the radio resources are removed from the radio resource allocation table.

Further, the first radio resource allocation determination unit 150 acquires reference information by referring to the communication history table TB1 stored in the first communication history storage unit 140, and sets the priority of the frequency for allocating the radio resource. In other words, the first radio resource allocation determination unit 150 has a function as a priority setting unit.

The first radio resource allocation determination unit 150 selects the frequency allocated to the terminal 200, depending on the set priority, and selects the radio resource of the selected frequency. In this case, if illustration is given using FIG. 2, the frequency f1 is selected, and the unallocated radio resource of the frequency f1 is selected. The first radio resource allocation determination unit 150 allocates the selected radio resources to the terminal 200.

The first radio resource allocation determination unit 150 outputs information regarding the allocated radio resources to the transmission packet generation unit 160 while being included in first radio resource allocation information. The first radio resource allocation information includes information regarding the frequency and the radio resource (for example, allocation amount of the radio resource) for transmitting a transmission packet through the uplink channel 310. The allocation request source of radio resource is, for example, the terminal 200.

Further, the first radio resource allocation determination unit 150 outputs the first radio resource allocation information to the first communication history storage unit 140. The selected frequency corresponds to the frequency for which the history of the allocation amount of the radio resource in communication history table TB1 is updated. In addition, the allocation amount of the radio resource updated in the communication history table TB1 may correspond to the allocation amount of the radio resource of data received by the base station 100, as a result of transmission of data by the terminal 200 by using the selected frequency. Accordingly the history of the allocation amount of the radio resource of the selected frequency may be updated based on the information regarding the allocation amount of the radio resources from the received packet decoding unit 130 in the subsequent time.

The transmission packet generation unit 160 generates a transmission packet including, for example, user data to the terminal 200 (for example, display data for image data from the terminal 200) and the control data. The control data includes the first radio resource allocation information acquired from the first radio resource allocation determination unit 150. The transmission packet generation unit 160 outputs the generated transmission packet to the wireless transmitting unit 190.

The second communication history storage unit 170 is configured with, for example, a RAM. The second communication history storage unit 170 includes a communication history table TB3 that stores an allocation amount of the radio resource of data that has been communicated in the past through the downlink channel 320 from the base station 100 to the terminal 200 for each frequency. Further, the information stored in the communication history table TB3 is an example of the communication history information and an example of a second communication history information.

The memory contents of the communication history table TB3 is updated based on information regarding a frequency from the second radio resource allocation determination unit 180 and information regarding the allocation amount of the radio resources. The second communication history storage unit 170 is updated by the second radio resource allocation determination unit 180. Further, in the communication history table TB3, information may be reset at regular intervals.

The second radio resource allocation determination unit 180 allocates the radio resources to the terminal 200 by referring to the radio resource allocation table. Further, the second radio resource allocation determination unit 180 acquires reference information by referring to the communication history table TB3 stored in the second communication history storage unit 170, and sets the priority of the frequency for allocating the radio resource. In other words, the second radio resource allocation determination unit 180 has a function as the priority setting unit.

The second radio resource allocation determination unit 180 selects the frequency allocated to the base station 100 which is its own station, depending on the set priority, and selects unallocated radio resources of the selected frequency. The second radio resource allocation determination unit 180 allocates the selected radio resources to the base station 100.

The second radio resource allocation determination unit 180 outputs information regarding the allocated radio resource to the wireless transmitting unit 190 while being included in the second radio resource allocation information. The second radio resource allocation information includes information regarding the frequency and the radio resources for transmitting the transmission packet through the downlink channel 320.

Further, the second radio resource allocation determination unit 180 outputs the second radio resource allocation information to the second communication history storage unit 170. The selected frequency corresponds to the frequency for which the history of the allocation amount of the radio resource is updated in communication history table TB3. In addition, the allocation amount of the radio resources which is updated in the communication history table TB3 corresponds to the allocation amount of the radio resources of the data transmitted to the terminal 200 by the base station 100 by using the determined frequency. Accordingly, the history of the allocation amount of the radio resource of the determined frequency may be updated based on the information regarding the allocation amount of the radio resources at the present time from the transmission packet generation unit 160.

In addition, the terminal 200 may return information regarding a record value of receiving a packet from the base station 100 to the base station 100, and the second communication history storage unit 170 may be updated based on the information regarding the record value.

The wireless transmitting unit 190 performs, for example, an encoding process, a frequency-conversion process, or a modulation process on a transmission packet from the transmission packet generation unit 160. Then, a transmission signal is generated from the transmission packet, based on the second radio resource allocation information from the second radio resource allocation determination unit 180. The wireless transmitting unit 190 outputs the generated transmission signal to the transmission antenna 195. Further, the wireless transmitting unit 190 determines a radio resource carrying a packet.

The transmission antenna 195 transmits the transmission signal from the wireless transmitting unit 190 as the communication signal to the terminal 200, through the downlink channel 320.

The received packet decoding unit 130, the first radio resource allocation determination unit 150, the transmission packet generation unit 160, and the second radio resource allocation determination unit 180 implement respective functions by executing programs stored in a storage unit which is not shown.

The communication history table TB1 included in the first communication history storage unit 140 and the communication history table TB3 included in the second communication history storage unit 170 may be the same or may be different.

When the communication history tables TB1 and TB3 are the same, any one of the first communication history storage unit 140 and the second communication history storage unit 170 may include the communication history table TB1.

When the communication history tables TB1 and TB3 are different, it is possible to accumulate the communication record of each of the uplink channel 310 and the downlink channel 320. Accordingly, even when the uplink channel 310 and the downlink channel 320 have different communication characteristics, the allocation of the radio resources suitable for each wireless channel is possible.

Further, the wireless receiving unit 120 and the wireless transmitting unit 190 have a function as a communication unit that communicates data by using the allocated radio resource.

The terminal 200 includes a reception antenna 210, a wireless receiving unit 220, a received packet decoding unit 230, a transmission packet generation unit 240, a wireless transmitting unit 250, and a transmission antenna 260.

The reception antenna 210 receives a communication signal that is communicated through the downlink channel 320, and outputs the communication signal which is a reception signal to the wireless receiving unit 220.

The wireless receiving unit 220 receives the reception signal from the reception antenna 210. Further, the wireless receiving unit 220 performs, for example, a demodulation process and a frequency-conversion process on the reception signal so as to acquire a reception packet from the reception signal. The wireless receiving unit 220 outputs the reception packet to the received packet decoding unit 230.

The received packet decoding unit 230 receives the reception packet from the wireless receiving unit 220, and performs a decoding process on the reception packet. Through the decoding process, the received packet decoding unit 230 acquires, for example, user data (for example, display data) and control data from the base station 100. The control data includes first radio resource allocation information. The user data is output to a processing unit at a subsequent stage which is not shown. Further, the control data is output to the wireless transmitting unit 250.

The transmission packet generation unit 240 generates a transmission packet including, for example, user data (for example, image data and audio data) to the base station 100. The transmission packet generation unit 240 outputs the generated transmission packet to the wireless transmitting unit 250.

The wireless transmitting unit 250 performs, for example, an encoding process, a frequency-conversion process, or a modulation process on the transmission packet from the transmission packet generation unit 240. Further, the wireless transmitting unit 250 generates a transmission signal from the transmission packet, based on the control data from the received packet decoding unit 230. The first radio resource allocation information included in the control data includes information regarding the frequency and the radio resources which are allocated by the base station 100. The wireless transmitting unit 250 outputs the generated transmission signal to the transmission antenna 260. In other words, the transmission signal is transmitted to the base station 100 by using the radio resource of the frequency allocated by the base station 100.

The transmission antenna 260 transmits the transmission signal from the wireless transmitting unit 250 as the communication signal to the base station 100, through the uplink channel 310.

The received packet decoding unit 230 and the transmission packet generation unit 240 implement respective functions by performing programs stored in a storage unit which is not shown.

Further, a data amount may be used as the record indicator of the communication history.

Figure 17:
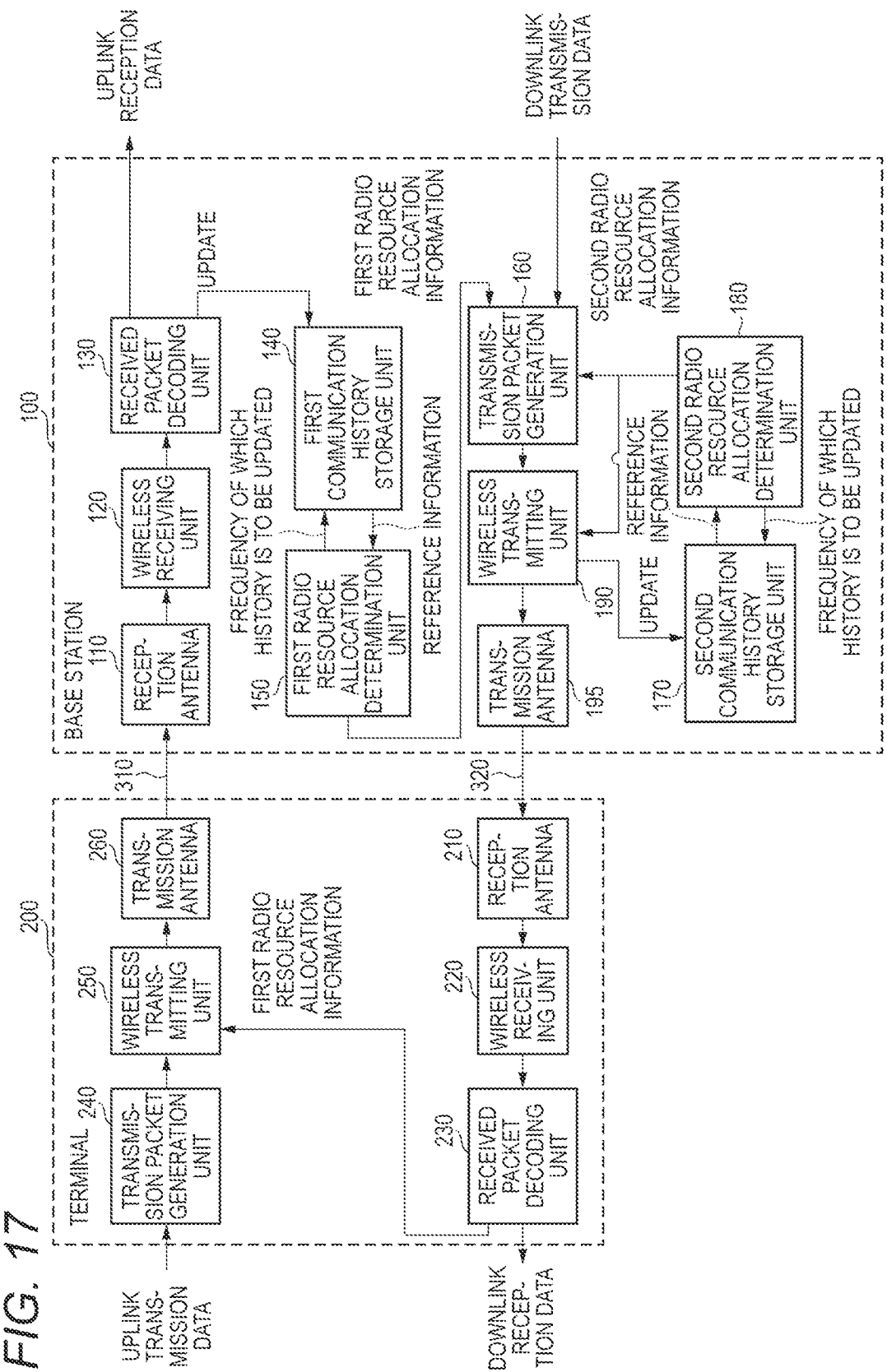
FIG. 17 is a block diagram illustrating a modified configuration example of the wireless base station device and the wireless communication terminal of the first embodiment of the present invention.

FIG. 17 is a block diagram illustrating a modified configuration example of the base station 100 and the terminal 200.

The components in FIG. 17 different from those in FIG. 4 will be described.

The received packet decoding unit 130 counts the data amount of the decoded data (for example, the number of reception packets), and outputs the information regarding the data amount to the first communication history storage unit 140.

The first communication history storage unit 140 includes a communication history table TB1 that stores the amount of the data that has been communicated in the past, through the uplink channel 310 from the terminal 200 to the base station 100 for each frequency. The data amount is, for example, the number of bits, the number of bytes, or the number of packets.

The memory content of the communication history table TB1 is updated based on information regarding frequency for which the history from the first radio resource allocation determination unit 150 is to be updated and information regarding the data amount from the received packet decoding unit 130. The information stored in the first communication history storage unit 140 may be updated by the received packet decoding unit 130 or the first radio resource allocation determination unit 150.

The first radio resource allocation determination unit 150 outputs information regarding the selected frequency to the first communication history storage unit 140. The selected frequency corresponds to the frequency for which the history of the data amount is updated in the communication history table TB1. In addition, the data amount updated in the communication history table TB1 may correspond to the data amount of the data received by the base station 100, as a result of transmission of data by the terminal 200 by using the selected frequency. Accordingly, the history of the data amount of the selected frequency may be updated, based on the information regarding the data amount from the received packet decoding unit 130 in the subsequent time.

The second communication history storage unit 170 includes a communication history table TB3 that stores the data amount of the data that has been communicated in the past, through the downlink channel 320 from the base station 100 to the terminal 200. The data amount is, for example, the number of bits, the number of bytes, or the number of packets.

The memory content of the communication history table TB3 is updated based on the information regarding a frequency from the second radio resource allocation determination unit 180, and the information regarding the data amount from the wireless transmitting unit 190. The second communication history storage unit 170 may be updated by the wireless transmitting unit 190, or the second radio resource allocation determination unit 180.

The second radio resource allocation determination unit 180 outputs information regarding the selected frequency to the second communication history storage unit 170. The selected frequency corresponds to the frequency for which the history of the data amount in the communication history table TB3 is updated. In addition, the data amount updated in the communication history table TB3 corresponds to the data amount of data transmitted to the terminal 200 by the base station 100 by using the determined frequency. Accordingly, the history of the data amount of the determined frequency may be updated, based on the information regarding the current data amount from the wireless transmitting unit 190.

The wireless transmitting unit 190 calculates the data amount of the transmission packet, and outputs the information regarding the data amount to the second communication history storage unit 170. The data amount of the transmission packet is an amount of transmission data that is determined in view of, for example, a modulation scheme or an error correction coding scheme, and is, for example, an information bit amount.

Next, an allocation method of radio resources by the base station 100 will be described.

First, the outline for the allocation of the radio resources will be described.

FIG. 5 is a diagram illustrating an example of a communication history table TB1 included in the base station 100 (BS1 to BS4). FIG. 5 illustrates a data amount for each frequency (unit: one hundred million bits) provided for the past 100 hours. Here, the data amount is assumed to be an example of the record indicator of the communication history.

For example, when the base station BS3 allocates radio resources to the terminal T1, the base station BS3 sets the frequency f1 in which the data of the largest amount has successfully been transmitted for the past 100hours, among the frequencies f1 to f5, to a first priority order of radio resource allocation (priority), and uses it as the allocation candidate.

When, for example, an adjacent base station BS1 has already allocated a radio resource of the frequency f1, and the allocation of the radio resource of the frequency f1 is not possible, the base station BS3 uses the frequency f5 ranked second in the priority order of radio resource allocation as an allocation candidate.

The base station BS3 adds the information regarding the data amount of the data communicated with the terminal T1 to the frequency (for example, frequency f1) which is actually allocated.

Accordingly, since the priority order of radio resource allocation of the frequency which is actually allocated is increased, the radio resource of a frequency with a record is likely to be selected. Accordingly, the communication reliability of the base station BS3 is improved.

Figure 6:
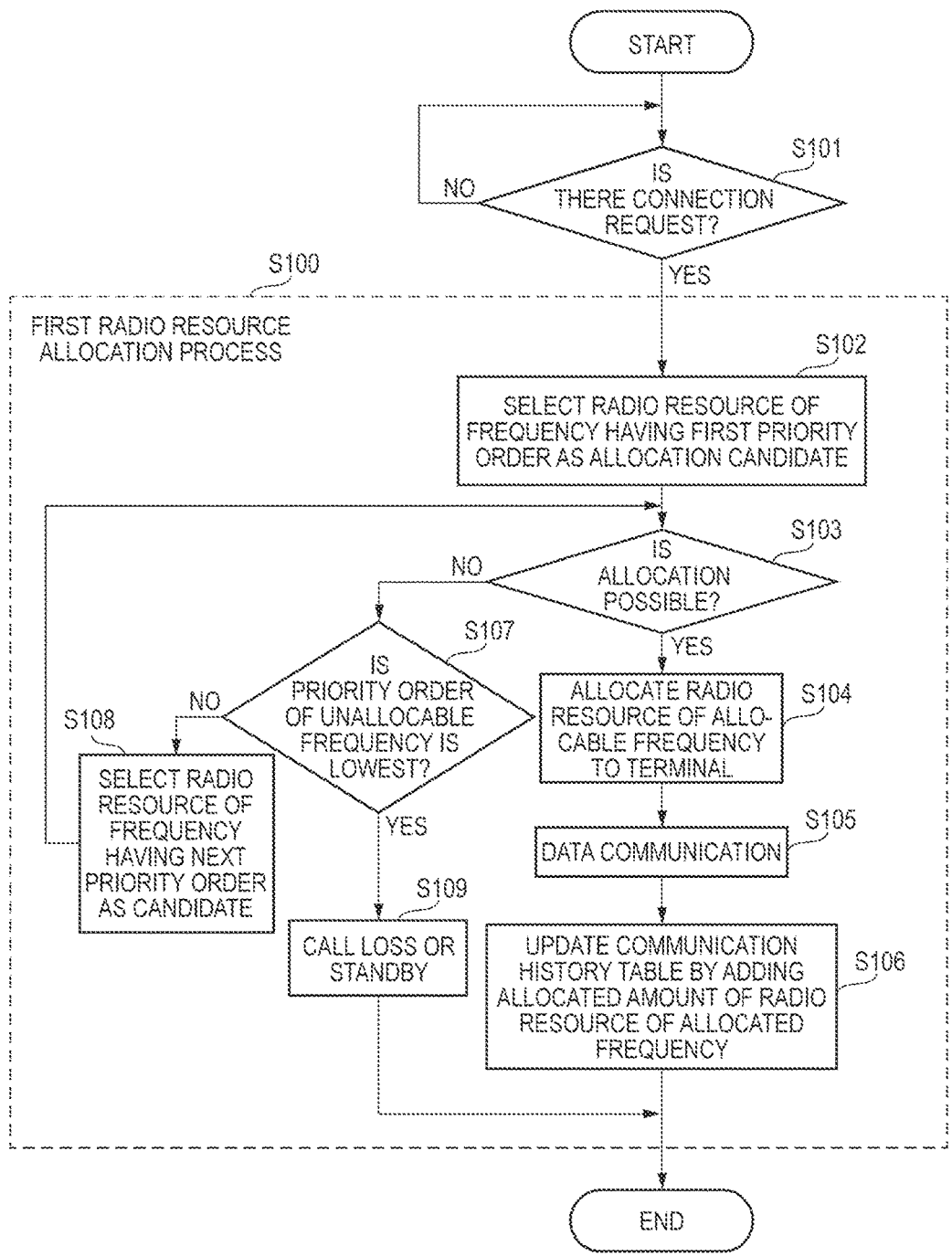
FIG. 6 is a flowchart illustrating an operation example at a time of radio resource allocation by the base station according to the first embodiment of the present invention.

Next, FIG. 6 is a flowchart illustrating an operation example at the time of radio resource allocation by the base station 100. Here, an allocation amount of the radio resource is assumed to be an example of a record indicator of the communication history.

First, the first radio resource allocation determination unit 150 or the second radio resource allocation determination unit 180 determines whether or not there is a connection request (step S101). The connection request includes an allocation request for the radio resources. Specifically, the first radio resource allocation determination unit 150 determines whether or not there is a connection request from the terminal 200. Further, the second radio resource allocation determination unit 180 determines whether a connection request for data transmission to the terminal 200 occurs.

When there is the connection request, the base station 100 performs a first radio resource allocation process (step S100). The first radio resource allocation process is a radio resource allocation process considering the past record. Step S100 includes steps S102 to S109 which will be described later.

In the radio resource allocation process, the first radio resource allocation determination unit 150 selects a radio resource of a frequency having a first priority order of radio resource allocation, as a radio resource allocation candidate, by referring to the communication history table TB1 (step S102). The priority order is determined according to the goodness of the past record, and, for example, the priority order of the radio resource of a frequency in which the amount of data that has been communicated is large is set high.

Similarly, the second radio resource allocation determination unit 180 selects radio resources of a frequency having a first priority order of radio resource allocation, as a radio resource allocation candidate, by referring to the communication history table TB3.

Subsequently, the first radio resource allocation determination unit 150 determines whether or not the allocation of the radio resource of the selected frequency is possible, by referring to the radio resource allocation table (step S103).

The case in which allocation is possible refers to, for example, a case in which the selected frequency is not yet allocated to other terminals 200, or a case in which the radio resource of the selected radio resource has already been allocated, but there are sufficient unallocated radio resources of the frequency. In contrast, the case in which allocation is not possible refers to, for example, a case in which the selected frequency has already been allocated and there are insufficient unallocated radio resources of the frequency.

In addition, the base station 100 may determine whether allocation is possible by acquiring information indicating that another base station 100 of the same business entity allocates the radio resource of the frequency to another terminal 200. The information corresponds to the first radio resource allocation information of the adjacent base station according to the second embodiment.

When the allocation of the radio resource of the selected frequency is possible, the first radio resource allocation determination unit 150 allocates the unallocated radio resource of the selected frequency to the terminal 200 (step S104).

Similarly, when the allocation of the radio resource of the selected frequency is possible, the second radio resource allocation determination unit 180 allocates the unallocated radio resource of the selected frequency to the base station 100 which is its own station.

Subsequently, the wireless transmitting unit 190 transmits first radio resource allocation information including information regarding the allocated frequency and the radio resource to the terminal 200 (step S105). At this time, the wireless transmitting unit 190 transmits data by using the radio resource of the frequency included in the second radio resource allocation information from the second radio resource allocation determination unit 180.

Subsequently, the first radio resource allocation determination unit 150 updates the allocation amount of the radio resource of the selected frequency that is stored in the communication history table TB1 (step S106). The first radio resource allocation determination unit 150 updates information, for example, by adding the data amount at the present time to the amount of data in the past which has been communicated by using the selected frequency.

Similarly, the second radio resource allocation determination unit 180 updates the communication data amount of the selected frequency that is stored in the communication history table TB3. The second radio resource allocation determination unit 180 updates information, for example, by adding the data amount at the present time to the amount of data in the past which has been communicated by using the selected frequency.

Meanwhile, when the allocation of the radio resource of the selected frequency is not possible in step S103, the first radio resource allocation determination unit 150 determines whether or not the selected frequency is a frequency having the lowest priority order of radio resource allocation (step S107).

When the priority order of the frequency is not the lowest one, the first radio resource allocation determination unit 150 searches for the radio resource of the next frequency, and thus selects the radio resource of the next frequency as the radio resource allocation candidate (step S108).

Meanwhile, when the priority order of the frequency is the lowest one, there is no allocatable radio resource of the frequency, and thus a call is lost or is on standby (step S109).

Similarly, the second radio resource allocation determination unit 180 also performs the process of steps S107 to S109.

FIG. 7 is a diagram illustrating an example of communication history information stored in the communication history table TB1. Here, the data amount is assumed to be an example of the record indicator of the communication history. In the example of FIG. 7, since the amount of data that has been communicated by using the frequency f2 is largest at 4.5 billion bits, the priority order of radio resource allocation of the frequency f2 is ranked first. If the allocation of the radio resource of the frequency f2 is possible, the radio resource of the frequency f2 is allocated, and the data amount of the frequency f2 is updated to, for example, 4.9 billion bits.

In this manner, the first radio resource allocation determination unit 150 or the second radio resource allocation determination unit 180 may set the priority of the frequency for allocating the radio resource, depending on the amount of data for each frequency that has been communicated in the past by the wireless transmitting unit 190 or the wireless receiving unit 120.

According to the base station 100, the probability of allocating radio resources of the frequencies that are used frequently and efficiently by the respective base stations 100 is increased, and thus it is possible to realize data communication with high reliability. Further, since it is not necessary for the respective base stations 100 to exchange control information regarding the allocation of the radio resource with each other, it is possible to reduce traffic in the communication system. Further, even when the base stations 100 cannot perform cooperative operation, it is possible to efficiently allocate the radio resources, and thus the frequency usage efficiency is increased.

Further, the first radio resource allocation determination unit 150 or the second radio resource allocation determination unit 180 may set the priority of the frequency for allocating the radio resources, depending on whether to communicate data through the uplink channel 310 or the downlink channel 320.

Thus, the radio resource of the frequency suitable for the channel characteristic of each communication channel is efficiently allocated.

(Second Embodiment)

According to a second embodiment, a case in which a plurality of business entities use a shared radio resource (for example, a white space (WS)) in a communication system is assumed. Hereinafter, an example of using a radio resource of a white space as the shared radio resource is presented.

Figure 8:
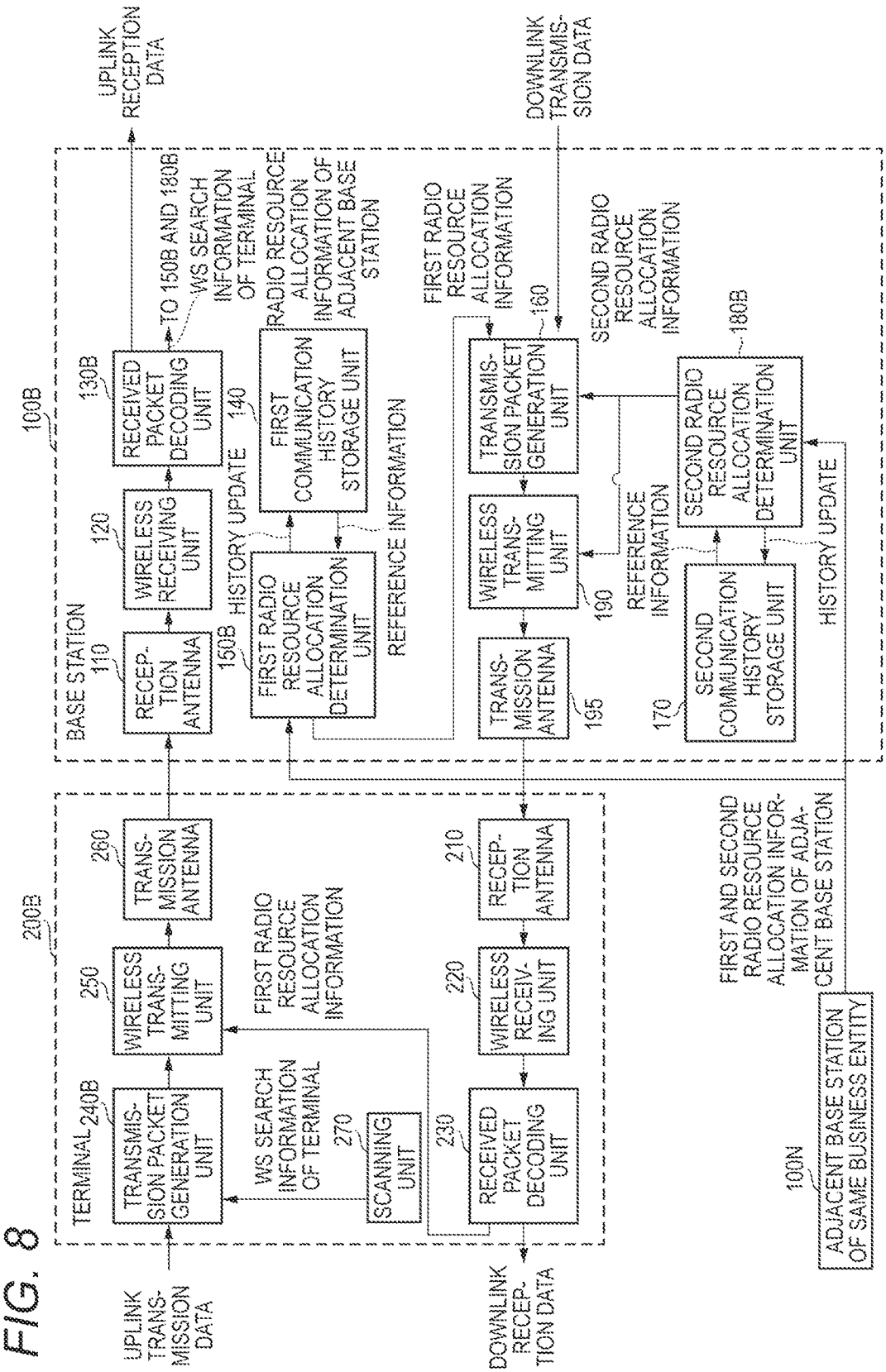
FIG. 8 is a block diagram illustrating a configuration example of a wireless base station device and a wireless communication terminal according to a second embodiment of the present invention.

FIG. 8 is a block diagram illustrating a configuration example of a base station 100B and a terminal 200B according to the second embodiment of the present invention. The same components of the base station 100B or the terminal 200B as those of the base station 100 or the terminal 200 according to the first embodiment are denoted by the same reference numerals, and thus the description thereof will be omitted or simplified.

The base station 100B includes a reception antenna 110, a wireless receiving unit 120, a received packet decoding unit 130B, a first communication history storage unit 140, a first radio resource allocation determination unit 150B, and a transmission packet generation unit 160. Further, the base station 100B includes a second communication history storage unit 170, a second radio resource allocation determination unit 180B, a wireless transmitting unit 190, and a transmission antenna 195.

The first radio resource allocation determination unit 150B and the second radio resource allocation determination unit 180B receive signals from another base station 100B adjacent to the base station 100B which is its own station (hereinafter, also referred to as an adjacent base station 100N), through a wired channel (for example, an X2 interface), at a predetermined timing. The respective base stations 100B are connected through the X2 interface.

The first radio resource allocation determination unit 150B and the second radio resource allocation determination unit 180B receive reception signals containing the first radio resource allocation information or the second radio resource allocation information regarding the adjacent base station 100N. The first radio resource allocation information or the second radio resource allocation information regarding the adjacent base station 100N is an example of communication history information regarding another station.

The contents of the first radio resource allocation information are the same in the base station 100B and the adjacent base station 100N. Further, the contents of the second radio resource allocation information are the same, in the base station 100B and the adjacent base station 100N.

The received packet decoding unit 130B has the same function as that of the received packet decoding unit 130. Further, the received packet decoding unit 130B acquires, for example, user data and control data from the terminal 200, through a decoding process. The control data includes WS search information regarding the terminal 200 which will be described later. The received packet decoding unit 130B outputs the WS search information regarding the terminal 200, to the first radio resource allocation determination unit 150 and the second radio resource allocation determination unit 180.

The first radio resource allocation determination unit 150B has the same function as that of the first radio resource allocation determination unit 150. Further, the first radio resource allocation determination unit 150B allocates an unallocated radio resource of a frequency satisfying a predetermined condition to the terminal 200B, based on the priority that has been set and at least one of the WS search information regarding the terminal 200B and the first radio resource allocation information regarding the adjacent base station 100N.

For example, the first radio resource allocation determination unit 150B allocates the radio resource of the white space that is not used by another wireless communication system to the terminal 200B, in view of the result of a scanning process by the terminal 200B. Thus, it is possible to satisfy an interference condition (interference is not detected) which is a prerequisite for communication using the white space.

Further, for example, the first radio resource allocation determination unit 150B preferentially allocates the unallocated radio resource of the frequency to which radio resource has already been allocated, in the adjacent base station 100N of the same business entity, to the terminal 200B. Thus, since allocation has been completed without using the radio resource of the frequency that has not been already allocated, the radio resource is efficiently allocated. Further, since the radio resource of the frequency that has actually and successfully been used in communication is used, the communication reliability is improved.

The second radio resource allocation determination unit 180B has the same function as that of the second radio resource allocation determination unit 180. Further, the second radio resource allocation determination unit 180B allocates an unallocated radio resource of a frequency satisfying a predetermined condition to the base station 100B, based on the priority that has been set, and at least one of the WS search information regarding the terminal 200B and the second radio resource allocation information regarding the adjacent base station 100N.

The terminal 200B includes a reception antenna 210, a wireless receiving unit 220, a received packet decoding unit 230, a transmission packet generation unit 240B, a wireless transmitting unit 250, a transmission antenna 260, and a scanning unit 270.

The scanning unit 270 performs a scanning process (carrier scanning) in order to check the existence of a wireless communication system that communicates using a white space in the vicinity of the terminal 200B. In other words, the scanning unit 270 has a function of detecting a state of use of the radio resource of the white space in the vicinity of the terminal 200B which is its own terminal. The scanning unit 270 outputs the result of the scanning process as the WS search information regarding the terminal 200B, to the transmission packet generation unit 240. The carrier is a carrier carrying wireless signals.

For example, a white space having a bandwidth of 10 MHz is assumed. When the output of a sensor included in the scanning unit 270 is equal to or greater than −114 dBm, the scanning unit 270 determines that another wireless communication system is detected, that is, the white space is in use and there is interference. In contrast, when the output of the sensor is less than −114 dBm, the scanning unit 270 determines that another carrier is not detected, that is, the WS frequency is not in use and there is no interference. The scanning unit 270 includes, for example, information regarding the presence or absence of the use of each white space in the WS search information regarding the terminal 200B.

The transmission packet generation unit 240B includes the WS search information of the terminal 200 from the scanning unit 270 in the control data so as to generate a transmission packet including user data and control data. The transmission packet generation unit 240B outputs the generated transmission packet to the wireless transmitting unit 250.

Wireless channels (for example, a microwave channel) may be used as communication channels between base stations.

In the wireless communication system for exchanging control information between the base stations, in the case of using a wireless channel as a communication interface (corresponding to the X2 interface in LTE), it is possible to apply a radio resource allocation method similar to an air interface for radio resource allocation.

Further, in the case of allocating the same wireless frequency resource for the air interface and the interface between base stations, the present embodiment may be applied with the air interface and the interface between the base stations as an object of the radio resource allocation in an integrated manner.

Further, a data amount may be used as the record indicator of the communication history.

FIG. 18 is a block diagram illustrating a modified example of a configuration of the base station 100B and the terminal 200B, and a data amount is assumed to be a record indicator of the communication history. The configuration of the wireless communication system of FIG. 18 is a configuration of a wireless communication system in which FIG. 8 and FIG. 17 are combined.

Next, the operation example of the base station 100B will be described.

Figure 9:
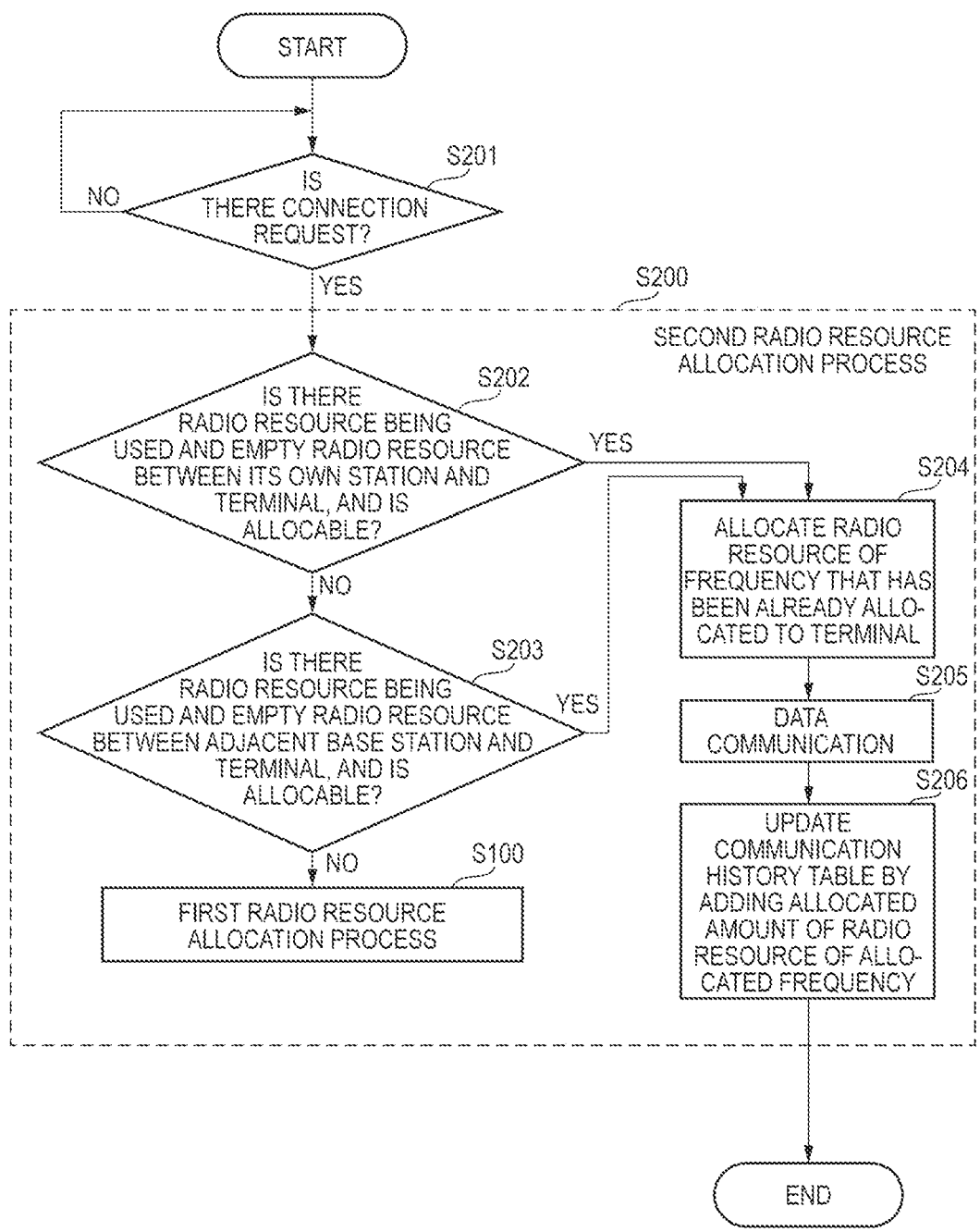
FIG. 9 is a flowchart illustrating an operation example at the time of radio resource allocation by the base station according to the second embodiment of the present invention.

FIG. 9 is a flowchart illustrating an operation example at the time of radio resource allocation by the base station 100B. Here, an allocation amount of the radio resource is assumed to be an example of a record indicator of the communication history.

First, the first radio resource allocation determination unit 150B determines whether or not there is a connection request (step S201). The connection request includes an allocation request for the radio resources. Specifically, the first radio resource allocation determination unit 150B determines whether or not there is the connection request from the terminal 200B. Further, the second radio resource allocation determination unit 180B determines whether or not a connection request for data transmission to the terminal 200B occurs.

When there is the connection request, the base station 100B performs a second radio resource allocation process (step S200). The second radio resource allocation process is a radio resource allocation process in consideration of the past records of a plurality of business entities. Step S200 includes steps S201 to S206 which will be described later, and step S100.

In the radio resource allocation process, the first radio resource allocation determination unit 150B determines whether or not there is a radio resource of the frequency that has already been allocated, there is an unallocated radio resource of the allocated frequency, and the base station 100B can allocate a radio resource of the allocated frequency (step S202).

The first radio resource allocation determination unit 150B can determine whether or not there is a radio resource of the frequency that has already been allocated by the base station 100B, by referring to, for example, the radio resource allocation table.

Further, the first radio resource allocation determination unit 150B can determine whether or not there is an unallocated radio resource of the allocated frequency, by determining, for example, whether the amount of the unallocated radio resources of the allocated frequency are larger than the amount of the radio resources required for data communication to the terminal 200B.

Further, the first radio resource allocation determination unit 150B can determine whether or not allocation is possible, by determining, for example, whether there is interference with the communication in another communication system (for example, a communication system of another business entity). It is possible to determine whether or not there is interference, based on WS search information of the terminal 200B. The WS search information includes information resulting from the scanning process by the terminal 200B. When there is interference, it is determined that allocation is not possible; and when there is no interference, it is determined that allocation is possible.

When at least one of the conditions of step S202 is not satisfied, the first radio resource allocation determination unit 150B determines whether or not there is a radio resource of the frequency that has already been allocated, there is an unallocated radio resource of the allocated frequency, and the adjacent base station 100N can allocate a radio resource of the allocated frequency (step S203). In other words, it is determined whether the same condition as the condition of step S202 is satisfied, based on the information from adjacent base station 100N. The information from the adjacent base station 100N includes first radio resource allocation information or second radio resource allocation information from the adjacent base station 100N.

When all the conditions of step S202 or step S203 are satisfied, the first radio resource allocation determination unit 150B allocates an unallocated radio resource of a frequency of which radio resources have already been allocated, to the terminal 200B (step S204).

Similarly, when all the conditions of step S202 or step S203 are satisfied, the second radio resource allocation determination unit 180B allocates an unallocated radio resource of a frequency of which radio resources have already been allocated, to the base station 100B.

Subsequently, the wireless transmitting unit 190 transmits the first radio resource allocation information including information regarding the allocated frequency and the radio resource, to the terminal 200 (step S205). At this time, the wireless transmitting unit 190 transmits data by using the radio resource of the frequency included in the second radio resource allocation information from the second radio resource allocation determination unit 180.

Subsequently, the first radio resource allocation determination unit 150B updates the allocation amount of the radio resource of the allocated frequency that is stored in the communication history table TB1 (step S206).

Similarly, the second radio resource allocation determination unit 180B updates the data amount of the allocated frequency that is stored in the communication history table TB3.

In contrast, when at least one of the conditions of step S203 is not satisfied, the base station 100B performs the first radio resource allocation process described above (step S100).

According to the process of FIG. 9, since it is possible to prevent communication interference by the scanning process, even if a communication system of another business entity exists, the radio resource is allocated with high accuracy. Further, it is possible to realize communication with better frequency utilization efficiency by receiving information regarding a usage state of the radio resource from another base station 100B of the same business entity (adjacent base station 100N).

In addition, the base station 100B may include a scanning unit which is not shown. It is assumed that the results of the scanning process by the base station 100B and the scanning process by the terminal 200B may be different depending on the communication environment in the respective vicinity thereof. Since the result from the scanning process by the base station 100B is added, it is possible to determine a preferable white space, in communication between the base station 100B and the terminal 200B (or another base station 100B). In other words, it is possible to further improve the accuracy of communication using the white space.

When the result of the scanning process by the base station 100B and the result of the scanning process by the terminal 200B are different, the result of the scanning process by the base station 100B may be prioritized, the result of the scanning process by the terminal 200B may be prioritized, or a frequency for which interference is detected even in one process may be determined to be unallocable.

(Third Embodiment)

According to a third embodiment, it is assumed to set the priority order of radio resource allocation depending on the transmission power.

Figure 10:
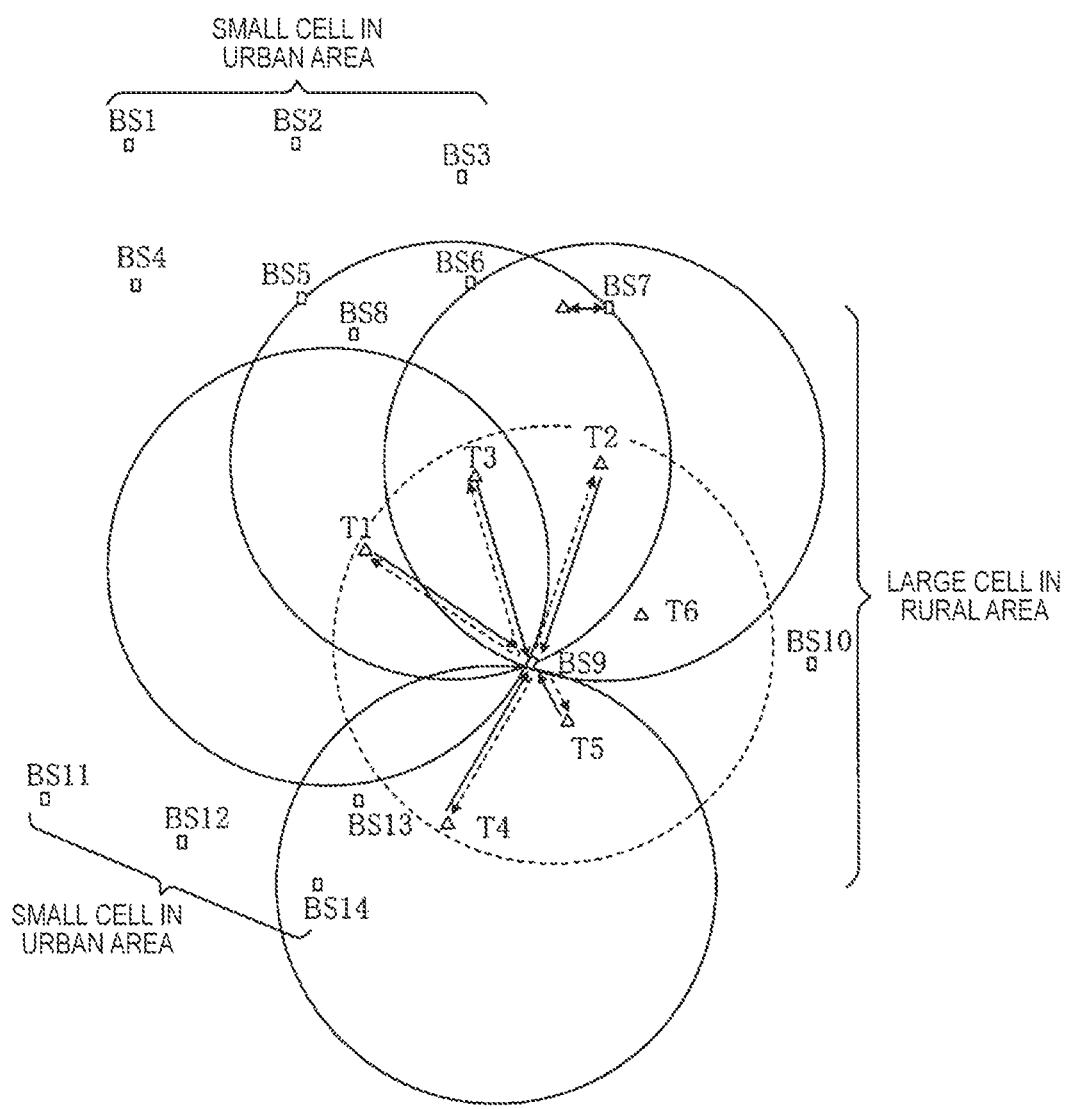
FIG. 10 is a diagram illustrating an arrangement example of a plurality of wireless base station devices and a plurality of wireless communication terminals which have different transmission power in a communication system according to a third embodiment of the present invention.

FIG. 10 is a diagram illustrating an arrangement example of a plurality of base stations BS1 to BS14 and a plurality of terminals T1 to T6 which have different transmission power in a communication system according to the third embodiment of the present invention. The base stations BS1 to BS14 correspond to the base station 100 or the base station 100B. The terminals T1 to T6 correspond to the terminal 200 or the terminal 200B.

The base stations BS1, BS2, BS3, BS11, BS12, and BS14 respectively form cells (small cells) in which the reach of radio waves are relatively small. The small cells are used in wireless communication, for example, in urban areas. The base stations BS1, BS2, BS3, BS11, BS12, and BS14 communicate with relatively low transmission power, in the small cells. Thus, the interference with communication in other cells is suppressed to be minimal. Further, the frequency utilization efficiency is improved.

The base stations BS4 to BS10, and BS13 respectively form cells (large cells) in which the reach of the respective radio waves are relatively large. The large cells are used for wireless communication, for example, in rural areas. The base stations BS4 to BS10, and BS13 communicate with relatively high transmission power, in the large cells. Thus, even if the distance between the wireless communication devices in the cell is long, communication is possible.

Next, the configuration example of the base station and terminal of the present embodiment will be described.

Although the base station of the present embodiment has the same configuration as that of the base station 100 or the base station 100B, the communication history tables TB1 and TB3 included in the base station 100 or 100B are different. Further, since the terminal of the present embodiment has the same configuration as that of the terminal 200 or the terminal 200B, the description thereof will be omitted. Hereinafter, the change in the communication history table TB1 will be described, but that in the communication history table TB3 is the same.

The base station 100 or 100B includes the communication history table TB1 (TB11, TB12, and . . . ), according to the transmission power of the base station 100 or 100B. For example, the base station BS1 that communicates with low transmission power includes a communication history table TB11 for low transmission power. Further, for example, the base station BS4 that communicates with high transmission power includes a communication history table TB12 for high transmission power.

FIG. 11A is a diagram illustrating an example of the communication history table TB11 for low transmission power. FIG. 11B is a diagram illustrating an example of the communication history table TB12 for high transmission power. Low transmission power refers to the case in which, for example, the transmission power is less than 5 W, and high transmission power refers to the case in which, for example, the transmission power is equal to or greater than 5 W. Here, the data amount is assumed to be an example of the record indicator of the communication history.

In the communication history table TB11, "0" is set as an initial value in each frequency. Meanwhile, in the communication history table TB11, a predetermined value of a predetermined frequency (for example, a value greater than an expected record value) is set as an initial value. In other words, communication is started from a state in which a data amount is offset in the predetermined frequency. In the example of FIG. 11(B), a data amount is offset in the frequencies f5 and f6.

For example, the base station BS4 allocates the radio resource of a frequency having a high priority order to terminal T1, by referring to the communication history table TB12 shown in FIG. 11(B). In this case, since the data amounts of the frequencies f5 and f6 are large, the base station BS4 preferentially uses the radio resources of the frequencies f5 and f6 as preferential allocation candidates. Therefore, when communicating with high transmission power, the allocated frequency is to be concentrated on a specific frequency, and the probability in which frequencies with high transmission power are limited to a small number is increased, such that communication interference is suppressed efficiently.

When communicating with low transmission power by using the communication history table TB11, in an initial state, the frequencies to be allocated are not particularly limited. In the communication system, if the base stations BS1 to BS14 communicate a predetermined number of times with low transmission power and high transmission power, in the communication with high transmission power, the radio resources of the frequency f5 or f6 are highly likely to be allocated.

Meanwhile, for example, when the base station 100 or 100B that communicates with high transmission power is located close to the base station 100 or 100B that communicates with low transmission power, communication interference occurs, such that the radio resources of the frequencies f5 and f6 are not allocated. Accordingly, in the communication with low transmission power, the probability of the radio resources of the frequencies f5 and f6 being allocated is reduced.

In this manner, since an initial value is set to a predetermined frequency of the communication history table TB12, as communication is performed in the communication system, it is possible to separate the frequencies used for the communication with low transmission power and the communication with high transmission power, with high efficiency. Accordingly, even in a communication system in which there are a plurality of wireless communication devices having different transmission power, communication reliability can be improved.

Next, the operation example of the base station 100 or 100B according to the present embodiment will be described.

Figure 12:
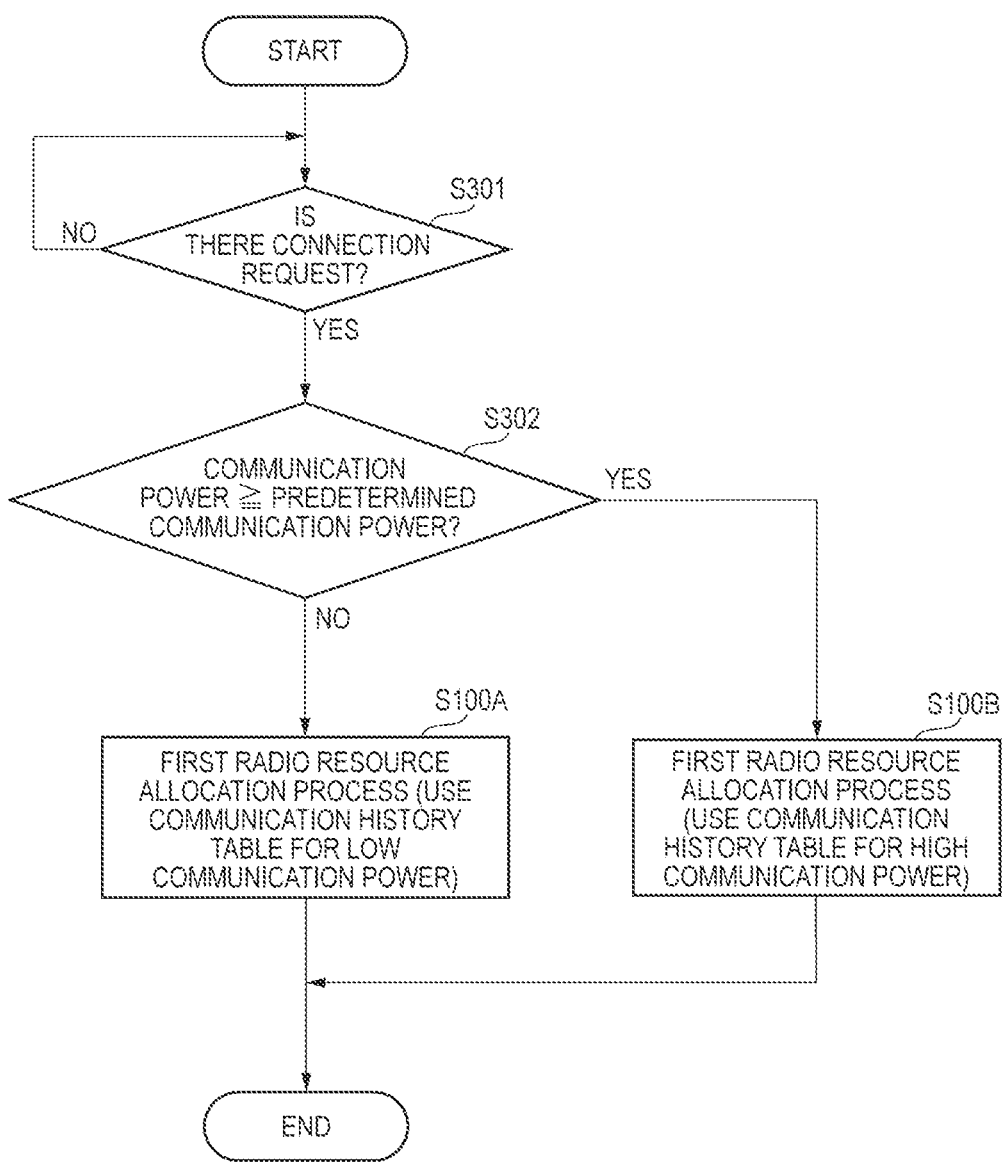
FIG. 12 is a flowchart illustrating a first operation example at a time of radio resource allocation by a base station according to the third embodiment of the present invention.

FIG. 12 is a flowchart illustrating a first operation example at the time of radio resource allocation by the base station 100. In FIG. 12, it is assumed that the same business entity communicates with different transmission power by using a dedicated radio resource.

First, the first radio resource allocation determination unit 150 determines whether or not there is a connection request (step S301). The connection request includes an allocation request for the radio resources.

When there is the connection request, the first radio resource allocation determination unit 150 determines whether or not the transmission power by the base station 100 is equal to or greater than the predetermined transmission power (step S302). The predetermined transmission power is, for example, 5 W. Information regarding the transmission power by the base station 100 is stored, for example, in a storage unit which is not shown.

When the transmission power is less than the predetermined transmission power, the base station 100 performs the first radio resource allocation process (step S100A). However, in step S100A, the first radio resource allocation determination unit 150 allocates the radio resource to the terminal 200, by referring to the communication history table TB11 for low power communication. Further, the first radio resource allocation determination unit 150 updates the communication history table TB11, based on the allocated record value.

In contrast, when the transmission power is equal to or greater than the predetermined transmission power, the base station 100 performs the first radio resource allocation process (step S100B). However, in step S100B, the first radio resource allocation determination unit 150 allocates a radio resource to the terminal 200, by referring to the communication history table TB12 for high power communication. Further, the first radio resource allocation determination unit 150 updates the communication history table TB12, based on the allocated record value.

According to the process in FIG. 12, even when the same business entity communicates with different transmission power by using a dedicated radio resource, the radio resources of the frequencies which are preferentially allocated for the respective transmission power can be separated, and thus communication interference is minimized.

Figure 13:
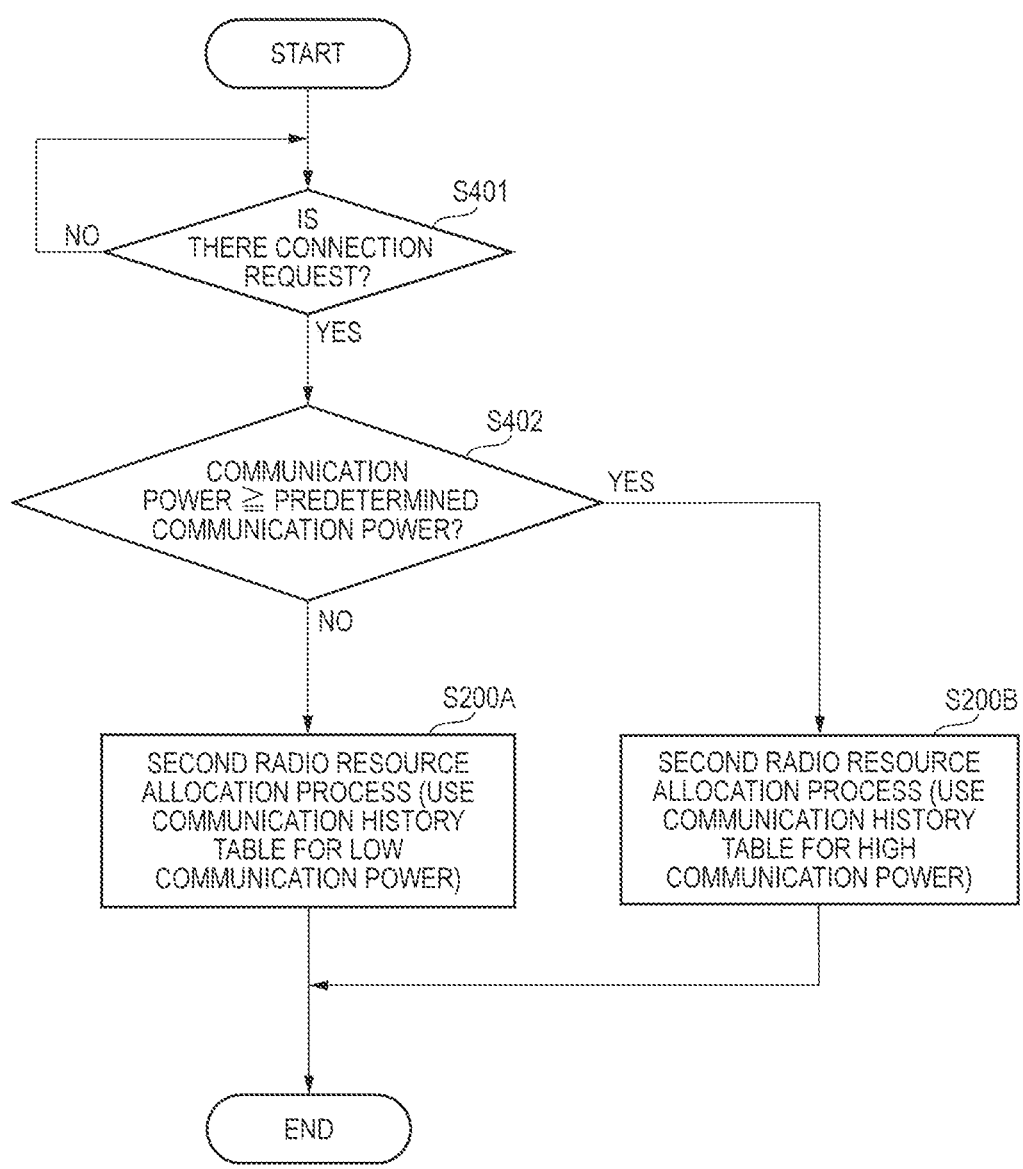
FIG. 13 is a flowchart illustrating a second operation example at a time of radio resource allocation by the base station according to the third embodiment of the present invention.

FIG. 13 is a flowchart illustrating a second operation example at the time of radio resource allocation by the base station 100B. In FIG. 13, a case is assumed in which a plurality of business entities communicate with different transmission power by using a shared radio resource.

First, the first radio resource allocation determination unit 150B determines whether or not there is a connection request (step S401). The connection request includes an allocation request for the radio resources.

When there is the connection request, the first radio resource allocation determination unit 150B determines whether or not the transmission power by the base station 100B is equal to or greater than predetermined transmission power (step S402). The predetermined transmission power is, for example, 5 W. The information regarding the transmission power by the base station 100B is stored in, for example, the storage unit which is not shown.

When the transmission power is less than a predetermined transmission power, the base station 100B performs a second radio resource allocation process (step S200A). However, in step S200A, the first radio resource allocation determination unit 150B allocates a radio resource to the terminal 200B, by referring to the communication history table TB11 for low power communication. Further, the first radio resource allocation determination unit 150B updates the communication history table TB11, based on the allocated record value.

In contrast, when the transmission power is equal to or greater than predetermined transmission power, the base station 100B performs the second radio resource allocation process (step S200B). However, in step S200B, the first radio resource allocation determination unit 150B allocates the radio resources to the terminal 200B, by referring to the communication history table TB12 for high power communication. Further, the first radio resource allocation determination unit 150B updates the communication history table TB12, based on the allocated record value.

According to the process of FIG. 13, even when a plurality of business entities communicate with different transmission power by using a shared radio resource, the frequencies to be allocated preferentially for the respective transmission power can be separated, and thus communication interference is minimized.

In this manner, the priority of the frequency for allocating the radio resource may be set according to the transmission power when the communication unit (for example, the wireless receiving unit 120 or the wireless transmitting unit 190) communicates data. Further, the communication history information may be used by being separated for each transmission power.

According to the communication system of the present embodiment, the following effects can be obtained.

For example, as FIG. 10, it is assumed that the terminals T1 to T4 which are connected to the base station BS9, and located away from the base station BS9 by a predetermined distance or more communicate with high transmission power by using different frequencies. In this case, as illustrated in FIG. 10, it is considered that interference excessively occurs in the four small cells, and the use of frequencies is limited. Therefore, it is desired that the number of frequencies for communication with high transmission power be limited to a small number.

Further, even in the base stations and terminals located outside the range of four adjacent small cells, communication interference occurs, and thus there is a possibility that radio resource in the vicinity of the frequency allocated to the base station BS9 simultaneously cannot be used.

Since the frequencies allocated preferentially for respective transmission power are separated by using the different communication history table TB1 depending on the transmission power, communication interference is minimized. Furthermore, the base stations BS4 to BS10, and BS13 which communicate with high transmission power set the priority order for a small number of the same frequencies to be higher, and thus the frequency utilization efficiency is further improved.

In addition, the communication history tables TB1 and TB3 may be of three or more types, instead of the two types of low transmission power and high transmission power.

Further, when the transmission power is switchable, the base station 100 or 100B includes the communication history tables TB1 and TB3 for the respective transmission power, and may switch the used communication history tables TB1 and TB3, depending on the transmission power.

(Fourth Embodiment)

According to a fourth embodiment, it is assumed that the priority order of radio resource allocation is set depending on a time zone in which a radio resource is used.

A configuration example of a base station and a terminal of the present embodiment will be described.

Although the base station of the present embodiment has the same configuration as that of the base station 100 or the base station 100B, the communication history tables TB1 and TB3 included in the base station 100 or 100B are different. Further, the base station 100 or the base station 100B includes a timer which is not shown (for example, a Real Time Clock (RTC)). Hereinafter, the change in the communication history table TB1 will be described, but that in the communication history table TB3 is the same.

Since the terminal of the present embodiment has the same configuration as that of the terminal 200 or the terminal 200B, the description thereof will be omitted.

The base station 100 or 100B includes a communication history table TB1 (TB1A, TB1B, TB1C, and . . . ) depending on the time zone in which the base station 100 or 100B communicates.

FIG. 14A is a diagram illustrating an example of a communication history table TB1A of a first time zone (for example, a daytime zone on weekdays). The daytime zone is, for example, 9:00-18:00. FIG. 14B is a diagram illustrating an example of a communication history table TB1B of a second time zone (for example, a night time zone on weekdays). The night time zone is, for example, 18:00-9:00. FIG. 14C is a diagram illustrating an example of a communication history table TB1C of a third time zone (for example, holidays). FIG. 14D is a diagram illustrating an example of a communication history table TB1D of all time zones. The data amount illustrated in FIG. 14A to FIG. 14D is an accumulated value (unit: billion bits) of the amount of data that has been provided for the past 100 hours. Here, the data amount is assumed to be an example of the record indicator of the communication history.

The first radio resource allocation determination unit 150 or 150B of the base station 100 or 100B selects any one of the communication history tables TB1A to TB1C for reference, in response to a current time which is counted by a timer. Further, the first radio resource allocation determination unit 150 or 150B updates any one of the selected communication history tables TB1A to TB1C, based on the data amount (record value) in the data communication.

The characteristics of the communication traffic are expected to be different depending on the time zone, but with respect to the frequency which is frequently used for each time zone, the data amount stored in the communication history table TB1 is increased. If the data amount is increased, the priority order of radio resource allocation is increased, and is even more likely to be selected. Accordingly, the radio resource of the frequency having a record of successful communication is preferentially allocated, and thus communication reliability is improved.

Next, the operation example of the base station 100 or 100B according to the present embodiment will be described.

Figure 15:
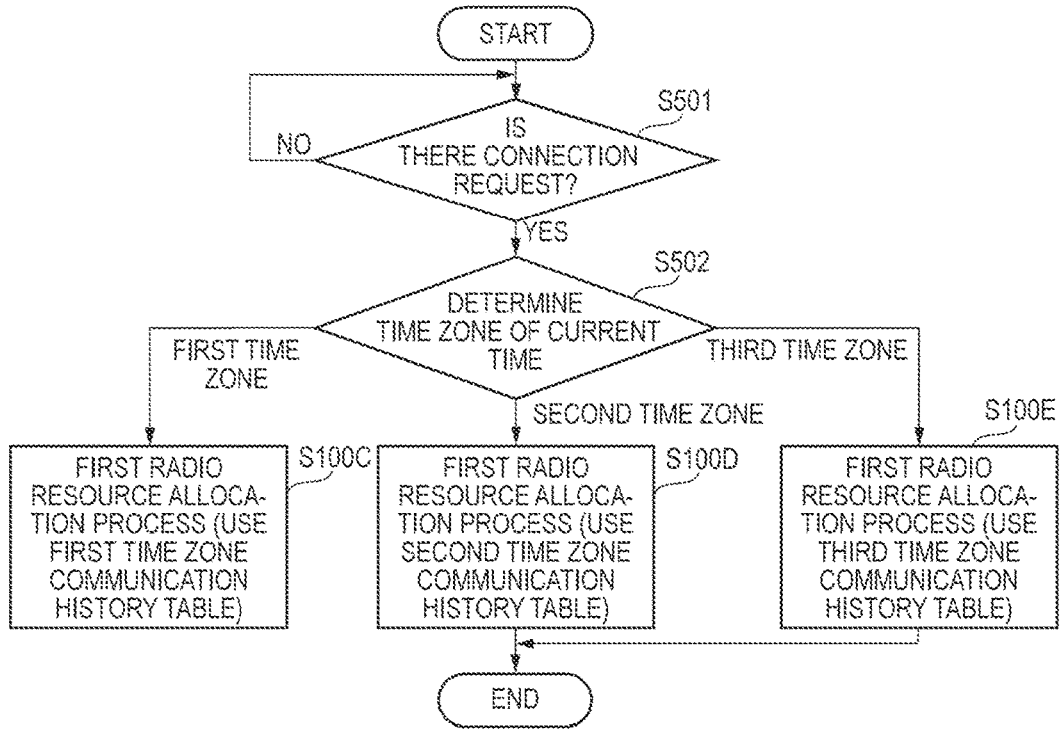
FIG. 15 is a flowchart illustrating a first operation example at a time of radio resource allocation by a base station according to the fourth embodiment of the present invention.

FIG. 15 is a flowchart illustrating a first operation example at the time of radio resource allocation by the base station 100. In FIG. 15, it is assumed that the same business entity communicates by using a dedicated radio resource.

First, the first radio resource allocation determination unit 150 determines whether or not there is a connection request (step S501). The connection request includes an allocation request for the radio resources.

When there is the connection request, the first radio resource allocation determination unit 150 determines the time zone to which the current time belongs, by referring to a timer (step S502). The time zone is, for example, a first time zone, a second time zone, or a third time zone.

When the current time belongs to the first time zone, the base station 100 performs the first radio resource allocation process (step S100C). However; in step S100C, the first radio resource allocation determination unit 150 allocates the radio resources to the terminal 200, by referring to a first time zone communication history table TB1A. Further, the first radio resource allocation determination unit 150 updates the communication history table TB1A, based on the allocated record value.

When the current time belongs to the second time zone, the base station 100 performs the first radio resource allocation process (step S100D). However, in step S100D, the first radio resource allocation determination unit 150 allocates the radio resources to the terminal 200, by referring to a second time zone communication history table TB1B. Further, the first radio resource allocation determination unit 150 updates the communication history table TB1B, based on the allocated record value.

When the current time belongs to the third time zone, the base station 100 performs the first radio resource allocation process (step S100E). However, in step S100E, the first radio resource allocation determination unit 150 allocates the radio resources to the terminal 200, by referring to a third time zone communication history table TB1C. Further, the first radio resource allocation determination unit 150 updates the communication history table TB1C, based on the allocated record value.

According to the process of FIG. 15, even when the same business entity communicates by using a dedicated radio resource, the frequencies which are preferentially allocated for the respective time zones can be separated, and thus the communication suitable for a communication traffic characteristic of the time zone is possible.

Figure 16:
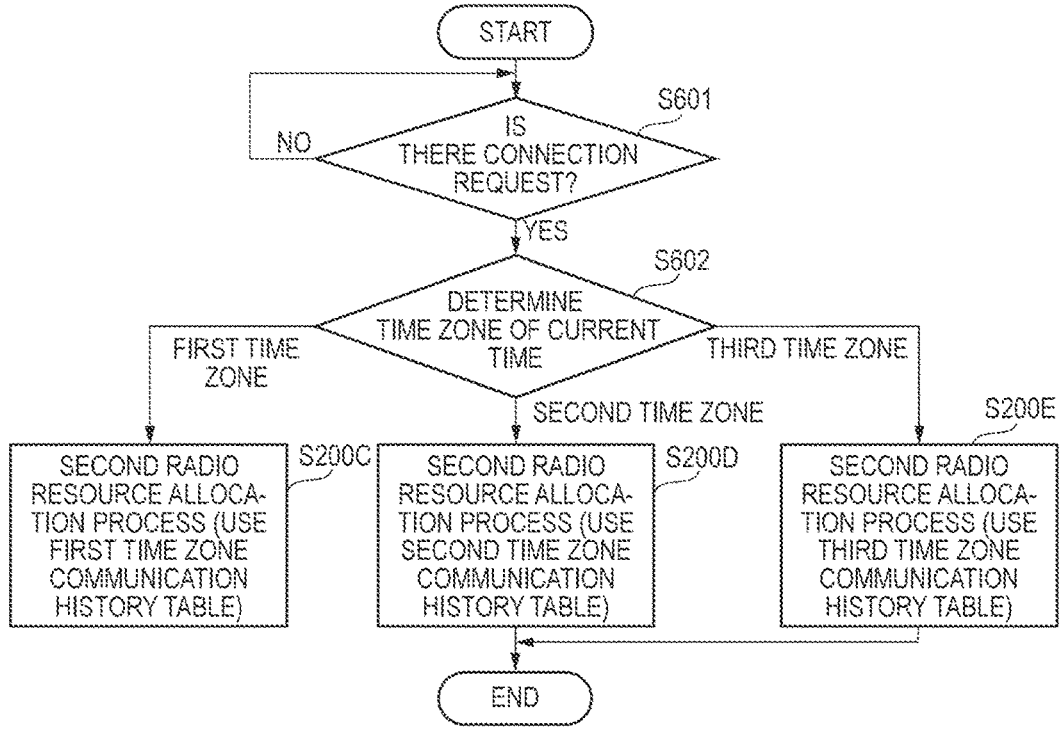
FIG. 16 is a flowchart illustrating a second operation example at a time of radio resource allocation by the base station according to the fourth embodiment of the present invention.

FIG. 16 is a flowchart illustrating a second operation example at the time of radio resource allocation by the base station 100B. In FIG. 16, a case is assumed in which a plurality of business entities communicate by using a shared radio resource.

First, the first radio resource allocation determination unit 150B determines whether or not there is a connection request (step S601). The connection request includes an allocation request for the radio resources.

When there is the connection request, the first radio resource allocation determination unit 150B determines the time zone to which the current time belongs, by referring to the timer (step S602). The time zone is, for example, a first time zone, a second time zone, or a third time zone.

When the current time belongs to the first time zone, the base station 100B performs the second radio resource allocation process (step S200C). However, in step S200C, the first radio resource allocation determination unit 150B allocates the radio resources to the terminal 200B, by referring to the first time zone communication history table TB1A. Further, the first radio resource allocation determination unit 150B updates the communication history table TB1A, based on the allocated record value.

When the current time belongs to the second time zone, the base station 100B performs the second radio resource allocation process (step S200D). However, in step S200D, the first radio resource allocation determination unit 150B allocates the radio resources to the terminal 200B, by referring to The second time zone communication history table TB1B. Further, the first radio resource allocation determination unit 150B updates the communication history table TB1B, based on the allocated record value.

When the current time belongs to the third time zone, the base station 100B performs the second radio resource allocation process (step S200E). However, in step S200E, the first radio resource allocation determination unit 150B allocates the radio resources to the terminal 200B, by referring to the third time zone communication history table TB1C. Further, the first radio resource allocation determination unit 150B updates the communication history table TB1C, based on the allocated record value.

According to the process in FIG. 16, even when the same business entity communicates by using a shared radio resource, the frequencies which are preferentially allocated for the respective time zone scan be separated, and thus communication suitable for a communication traffic characteristic of a time zone is possible.

In this manner, the priority of the frequency for allocating the radio resource may be set, depending on the time zone in which a communication unit (for example, the wireless receiving unit 120 or the wireless transmitting unit 190) communicates data. Further, communication history information may be used by being separated for each communication time zone.

According to the communication system of the present embodiment, the following effects can be obtained.

For example, it is expected that a base station located in a business area and a base station located in a residential area have significantly different characteristics of communication traffic depending on the time zone. In the case of the business area, it is expected that the amount of data communicated in the daytime zone on weekdays is large, and the amount of data communicated in the nighttime zone on weekdays and on holidays is small. In the case of a residential area, it is expected that the amount of data communicated in the daytime zone on weekdays is small, and the amount of data communicated in the nighttime zone on weekdays and holidays is large.

Radio resources of a desired frequency are allocated in consideration of the characteristics of the communication traffic in each time zone, by managing the priority order of radio resource allocation for each time zone. Therefore, communication reliability is improved.

In addition, the communication history tables TB1 may be of two types or four or more types, instead of three types for the first time zone to the third time zone.

The present invention is not intended to be limited to the above embodiments, and is applicable to any aspect as long as the functions indicated by the appended claims or the functions that the configuration of the present embodiment has can be achieved.

In the embodiment, the base station 100B and the terminal 200B of the embodiment may be a wireless communication device that communicates by using only a white space, or may be a wireless communication device that communicates by using the white space and a dedicated frequency.

Further, in the embodiment, it has been described that the first radio resource allocation determination unit or the second radio resource allocation determination unit sets the priority of the frequency for allocating radio resources based on the data amount. The data amount is determined by the number of RBs shown in FIG. 3 or a modulation scheme determined in the base station. Since the data amount is counted for billing in a typical communication system, it is easily deployed. The base station manages the data amount for each frequency as, for example, the record in the past.

Further, the first radio resource allocation determination unit or the second radio resource allocation determination unit may set the priority of the frequency, based on, for example, a "total time" in which data is communicated by the base station. The "total time" is intended for a probability in which the same frequency f1 is simultaneously allocated to a plurality of terminals. Since the "total time" is used, the degree of occupying radio resources and the degree to which adjacent base stations avoid allocating the same radio resource can be reflected more accurately. For example, the base station stores and manages "total time" for each frequency in the communication history tables TB1 and TB3 as the past record.

Further, the first radio resource allocation determination unit or the second radio resource allocation determination unit may set the priority of the frequency, based on, for example, the allocation amount of radio resources (for example, the number of RBs of FIG. 3). Since the allocation amount of radio resources is used, the degree of occupying radio resources can be reflected more accurately. The base station stores and manages the number of RBs for each frequency in the communication history tables TB1 and TB3 as the past record.

Further, the base station may manage the "total time" and the allocation amount of the radio resource by separating them depending on an uplink channel/downlink channel, transmission power, or time zone.

Accordingly, the first radio resource allocation determination unit or the second radio resource allocation determination unit may set the priority of the frequency for allocating the radio resources according to the allocation amount of radio resources for each frequency allocated in the past.

Further, the first radio resource allocation determination unit or the second radio resource allocation determination unit may set the priority of the frequency for allocating the radio resources according to the total time for each frequency in which data was communicated in the past by the communication unit (for example, the wireless transmitting unit 190 or the wireless receiving unit 120).

Further, the communication history information includes, for example, an allocation amount of radio resources for each frequency, a communication data amount for each frequency, and/or information regarding total communication time for each frequency. The first radio resource allocation determination unit or the second radio resource allocation determination unit may update the communication history information, based on the number of RBs for each frequency, the data amount for each frequency, and the total time for each frequency. Further, the first radio resource allocation determination unit or the second radio resource allocation determination unit may set the priority of the frequency, based on the communication history information.

Further, the communication history information regarding another station includes, for example, communication history information regarding another station including information regarding the allocation amount of radio resources for each frequency, the communication data amount for each frequency, or the information regarding the total communication time for each frequency by another base station (for example, adjacent base station).

Further, the present invention is applicable to a radio resource management program for realizing functions of the embodiment which is provided to a wireless base station device through a network or various storage media, and read and performed by a computer (CPU) in the wireless base station device.

Although the present invention has been described in detail with reference to specific embodiments, it is possible to make various changes and modifications without departing from the spirit and scope of the invention, as will be apparent to those skilled in the art.

The present invention is useful for a wireless base station device, a radio resource management method, a radio resource management program, and the like which can allocate radio resources with high accuracy.

The present application is continuation-in-part of International patent application No. PCT/JP2013/002711 filed on Apr. 22, 2013, which is based on Japanese patent application No. 2012-104121 filed on Apr. 27, 2012, the contents of which are incorporated herein by reference.

What is claimed is:

1. A wireless base station device comprising:
   a radio resource allocation unit that allocates radio resources to a wireless communication device;
   a communication unit that communicates data by using the radio resources that are allocated by the radio resource allocation unit; and
   a priority setting unit that sets a priority of a frequency for allocating the radio resources by the radio resource allocation unit, according to data on communication history of the radio resources for each frequency allocated by the radio resource allocation unit in a communication history during a past specific time period.

2. The wireless base station device according to claim 1, wherein
   the priority setting unit sets the priority of the frequency, according to a data amount of the data for each frequency that is communicated by the communication unit.

3. The wireless base station device according to claim 1, wherein
   the priority setting unit sets the priority of the frequency, according to a total time for each frequency in which data is communicated by the communication unit.

4. The wireless base station device according to claim 1, wherein
   the priority setting unit sets the priority of the frequency to be higher as a frequency has more allocation amount of the radio resource or data amount communicated by the communication unit, or as a frequency has a longer total time in which data is communicated by the communication unit.

5. The wireless base station device according to claim 1, further comprising:
   a reception unit that receives communication history information regarding another station including information regarding an allocation amount of radio resources for each frequency, a communication data amount for each frequency, or information regarding a total communication time for each frequency by another wireless base station device, wherein
   the radio resource allocation unit allocates the radio resources, based on the priority which is set by the priority setting unit and the communication history information regarding another station that is received by the reception unit.

6. The wireless base station device according to claim 1, wherein
   the radio resource allocation unit allocates the radio resources, according to the priority which is set by the priority setting unit, and a usage state of radio resources in a vicinity of the wireless communication device.

7. The wireless base station device according to claim 6, further comprising:

a reception unit that receives information regarding the usage state of radio resources in the vicinity of the wireless communication device.

8. The wireless base station device according to claim 1, further comprising:
a storage unit that stores communication history information including information regarding an allocation amount of radio resources for each frequency, a communication data amount for each frequency, or a total communication time for each frequency; and
an updating unit that updates the communication history information, based on an allocation amount of radio resources for each frequency that are allocated by the radio resource allocation unit, an amount of data that is communicated by the communication unit, or a total time in which data is communicated by the communication unit, wherein
the priority setting unit sets the priority of the frequency, based on the communication history information.

9. The wireless base station device according to claim 1, wherein
the priority setting unit sets the priority of the frequency, depending on whether the communication unit communicates data from another wireless communication device to the wireless base station device, or from the wireless base station device to another wireless communication device.

10. The wireless base station device according to claim 9, further comprising:
a storage unit that stores first communication history information for communicating data from the another wireless communication device to the wireless base station device by the communication unit, and second communication history information for communicating data from the wireless base station device to the another wireless communication device by the communication unit.

11. The wireless base station device according to claim 1, wherein
the priority setting unit sets the priority of the frequency, depending on transmission power applied when the communication unit communicates data.

12. The wireless base station device according to claim 11, further comprising:
a storage unit that stores communication history information, for each transmission power applied when the communication unit communicates data.

13. The wireless base station device according to claim 1, wherein
the priority setting unit sets the priority of the frequency, depending on a time zone in which the communication unit communicates data.

14. The wireless base station device according to claim 13, further comprising:
a storage unit that stores communication history information, for each time zone in which the communication unit communicates data.

15. A radio resource management method in a wireless base station device, the method comprising:
a radio resource allocation step of allocating radio resources of a frequency to a wireless communication device; and
a communication step of communicating data by using the radio resources that are allocated by the radio resource allocation step; and
a priority setting step of setting a priority of a frequency for allocating the radio resources in the radio resource allocation step, depending on data on communication history of the radio resources for each frequency allocated in the radio resource allocation step in a communication history during a past specific time period.

16. A non-transitory storage medium in which a radio resource management program is stored to cause a computer to execute respective steps of the radio resource management method as defined in claim 15.

17. A wireless base station device comprising:
a radio resource allocation unit that allocates radio resources to a wireless communication device;
a priority setting unit that sets a priority of a frequency for allocating the radio resources by the radio resource allocation unit, according to an allocation amount of the radio resources for each frequency allocated by the radio resource allocation unit; and
a reception unit that receives communication history information regarding another station including information regarding an allocation amount of radio resources for each frequency, a communication data amount for each frequency, or information regarding a total communication time for each frequency by another wireless base station device, wherein
the radio resource allocation unit allocates the radio resources, based on the priority which is set by the priority setting unit and the communication history information regarding another station that is received by the reception unit.

18. A wireless base station device comprising:
a radio resource allocation unit that allocates radio resources to a wireless communication device; and
a priority setting unit that sets a priority of a frequency for allocating the radio resources by the radio resource allocation unit, according to an allocation amount of the radio resources for each frequency allocated by the radio resource allocation unit, the radio resource allocation unit allocates the radio resources, according to the priority which is set by the priority setting unit, and a usage state of radio resources in a vicinity of the wireless communication device.

19. The wireless base station device according to claim 18, further comprising:
a reception unit that receives information regarding the usage state of radio resources in the vicinity of the wireless communication device.

* * * * *